United States Patent
Gainsboro et al.

(10) Patent No.: US 9,800,721 B2
(45) Date of Patent: Oct. 24, 2017

(54) MULTI-PARTY CONVERSATION ANALYZER AND LOGGER

(75) Inventors: Jay Gainsboro, Framingham, MA (US); Lee Davis Weinstein, Arlington, MA (US); Ken Sinclair, Waban, MA (US); Charles Barrasso, Franklin, MA (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 13/227,456

(22) Filed: Sep. 7, 2011

(65) Prior Publication Data

US 2014/0247926 A1    Sep. 4, 2014

Related U.S. Application Data

(60) Provisional application No. 61/380,325, filed on Sep. 7, 2010.

(51) Int. Cl.

| | |
|---|---|
| *H04M 1/64* | (2006.01) |
| *H04M 3/42* | (2006.01) |
| *H04M 3/22* | (2006.01) |
| *H04M 3/38* | (2006.01) |
| *G10L 15/26* | (2006.01) |
| *H04M 3/493* | (2006.01) |
| *G10L 15/22* | (2006.01) |

(Continued)

(52) U.S. Cl.
CPC .......... *H04M 3/2281* (2013.01); *G10L 15/08* (2013.01); *G10L 15/22* (2013.01); *G10L 15/26* (2013.01); *H04M 1/271* (2013.01); *H04M 3/2218* (2013.01); *H04M 3/38* (2013.01); *H04M 3/42221* (2013.01); *H04M 3/493* (2013.01); *H04M 3/4936* (2013.01); *H04M 2201/40* (2013.01); *H04M 2201/41* (2013.01)

(58) Field of Classification Search
CPC ............ G10L 17/005; H04M 2201/41; H04M 3/2281
USPC ......................................... 379/88.01–88.019
See application file for complete search history.

(56) References Cited

U.S. PATENT DOCUMENTS

| | | |
|---|---|---|
| 4,586,195 A | 4/1986 | DeGeorge et al. |
| 5,913,196 A | 6/1999 | Talmor et al. |

(Continued)

*Primary Examiner* — Solomon Bezuayehu
(74) *Attorney, Agent, or Firm* — Fogarty LLP

(57) ABSTRACT

In one aspect, the present invention facilitates the investigation of networks of criminals, by gathering associations between phone numbers, the names of persons reached at those phone numbers, and voice print data. In another aspect the invention automatically detects phone calls from a prison where the voiceprint of the person called matches the voiceprint of a past inmate. In another aspect the invention detects identity scams in prisons, by monitoring for known voice characteristics of likely imposters on phone calls made by prisoners. In another aspect, the invention automatically does speech-to-text conversion of phone numbers spoken within a predetermined time of detecting data indicative of a three-way call event while monitoring a phone call from a prison inmate. In another aspect, the invention automatically thwarts attempts of prison inmates to use re-dialing services. In another aspect, the invention automatically tags audio data retrieved from a database, by steganographically encoding into the audio data the identity of the official retrieving the audio data.

14 Claims, 14 Drawing Sheets

(51) Int. Cl.
    *H04M 1/27*        (2006.01)
    *G10L 15/08*       (2006.01)

(56)            References Cited

U.S. PATENT DOCUMENTS

| | | | |
|---|---|---|---|
| 6,163,604 | A | 12/2000 | Baulier et al. |
| 6,246,759 | B1 | 6/2001 | Greene et al. |
| 6,389,397 | B1 | 5/2002 | Otto |
| 6,505,160 | B1 | 1/2003 | Levy et al. |
| 6,510,415 | B1 | 1/2003 | Talmor et al. |
| 6,665,376 | B1 | 12/2003 | Brown |
| 7,136,458 | B1* | 11/2006 | Zellner et al. ............ 379/88.02 |
| 7,376,557 | B2 | 5/2008 | Specht et al. |
| 7,698,566 | B1 | 4/2010 | Stone |
| 7,853,243 | B2* | 12/2010 | Hodge .................. H04M 1/67 379/142.05 |
| 8,180,027 | B1 | 5/2012 | Magnuson et al. |
| 9,386,146 | B2 | 7/2016 | Gainsboro et al. |
| 2002/0094072 | A1 | 7/2002 | Evans et al. |
| 2003/0147519 | A1* | 8/2003 | Jain .................. H04M 3/42008 379/211.02 |
| 2004/0122668 | A1 | 6/2004 | Marino et al. |
| 2004/0186724 | A1 | 9/2004 | Morin |
| 2004/0240631 | A1 | 12/2004 | Broman et al. |
| 2004/0245330 | A1 | 12/2004 | Swift et al. |
| 2005/0069095 | A1* | 3/2005 | Fellenstein .......... H04M 3/533 379/88.02 |
| 2005/0185779 | A1 | 8/2005 | Toms |
| 2006/0270465 | A1 | 11/2006 | Lee et al. |
| 2006/0286969 | A1 | 12/2006 | Talmor et al. |
| 2007/0003027 | A1 | 1/2007 | Brandt |
| 2007/0071206 | A1* | 3/2007 | Gainsboro et al. ........... 379/168 |
| 2007/0086600 | A1 | 4/2007 | Boesen |
| 2007/0219800 | A1 | 9/2007 | Hymel et al. |
| 2007/0280436 | A1 | 12/2007 | Rajakumar |
| 2008/0069327 | A1 | 3/2008 | Kingsley et al. |
| 2008/0118042 | A1* | 5/2008 | Hogg ........................ 379/93.03 |
| 2008/0198978 | A1 | 8/2008 | Olligschlaeger |
| 2008/0300877 | A1 | 12/2008 | Gilbert et al. |
| 2008/0304643 | A1 | 12/2008 | Hodge |
| 2009/0119106 | A1 | 5/2009 | Rajakumar et al. |
| 2009/0129627 | A1 | 5/2009 | Levy et al. |
| 2009/0152343 | A1 | 6/2009 | Carter et al. |
| 2009/0228278 | A1 | 9/2009 | Huh et al. |
| 2009/0262975 | A1 | 10/2009 | Rhoads et al. |
| 2009/0275365 | A1 | 11/2009 | Lee et al. |
| 2010/0027767 | A1 | 2/2010 | Gilbert |
| 2010/0106501 | A1 | 4/2010 | Miki et al. |
| 2010/0226525 | A1 | 9/2010 | Levy et al. |
| 2010/0246807 | A1 | 9/2010 | Kemmochi et al. |
| 2011/0072350 | A1 | 3/2011 | Bachtiger |
| 2011/0082874 | A1* | 4/2011 | Gainsboro ........ G06F 17/30398 707/769 |
| 2011/0228922 | A1 | 9/2011 | Dhara et al. |
| 2011/0288866 | A1 | 11/2011 | Rasmussen |
| 2011/0301940 | A1 | 12/2011 | Hon-Anderson et al. |
| 2012/0054202 | A1* | 3/2012 | Rajakumar .................. 707/748 |
| 2013/0244784 | A1 | 9/2013 | Assa |
| 2014/0254777 | A1 | 9/2014 | Olligschlaeger |
| 2014/0348358 | A1 | 11/2014 | Kraemer |
| 2015/0055763 | A1 | 2/2015 | Guerra et al. |
| 2015/0201081 | A1 | 7/2015 | Hodge et al. |
| 2015/0201083 | A1 | 7/2015 | Olligschlaeger |
| 2015/0271321 | A1 | 9/2015 | Gainsboro et al. |
| 2015/0381801 | A1 | 12/2015 | Rajakumar et al. |

\* cited by examiner

MULTI-PARTY CONVERSATION ANALYZER AND LOGGER

CROSS-REFERENCE TO RELATED PATENT APPLICATIONS

This patent application is related to U.S. patent application Ser. Nos. 11/475,541 and 12/284,450, and provisional patent application 61/380,325, all of which are herein incorporated by reference.

FIELD OF THE INVENTION

The field of the invention relates to prison phone systems, automatic monitoring of phone calls and conferences, speaker recognition, speaker identification, detection of three-way calls, audio data mining, voice logging, non-vocabulary-based analysis of dialog, affective computing, stenographic encoding of data within audio, and more specifically to automated analysis of multi-party conversations, and automated keyword searching.

BACKGROUND OF THE INVENTION

As the hardware and software to record conversations in digital form has become more and more affordable over recent years, recording and archiving of conversations such as customer service calls, teleclasses, business teleconferences, and calls made by prison inmates has become routine. As digital voice recorders have become more economical and easier to use, their use for dictation and note taking has been steadily increasing. It is expected that with the increasing availability of portable digital devices capable of audio recording (such as MP3 player/recorders, cell phones, and digital voice recorders) will continue to increase for many years to come, and that the uses of these devices will continue to expand. Indeed, we are approaching the time when audio recording of one's entire lifetime experience will be practical and economical. As the amount of monitored and stored audio data increases, there is an ever increasing need for technological tools which can extract information from digital audio data. Background information on a number of conversation-recording market segments, as well as background information on speech recognition, voice verification, and voice identification is presented below.

Prison Market

Modern correctional institutions face many challenges concerning phone calls made by inmates. One intent of correctional institutions is to restrict inmates from making phone calls to persons they should not be contacting. To help accomplish this aim, many modern prison phone systems require inmates to use an identifying PIN to use the phone system, and the phone system enforces limitations on numbers which can be directly dialed, based on the prisoner's individual PIN. Many prison phone systems, for instance, limit a given prisoner to dialing one of a pre-approved set of phone numbers when making calls. One example of the type of phone call inmates are not allowed to make is phone calls to other convicted criminals (either in other prisons, or out on parole). Another example of the type of phone call inmates are not allowed to make is phone calls which threaten, intimidate, or harass someone. Another type of phone call prisoners have occasionally made which have embarrassed officials is a phone call to a public radio station, where the prisoner winds up speaking on the radio without authorization. One way in which inmates circumvent the limited-dialing restrictions of modern prison phone systems is to make a phone call to an "allowed party", who has invited over to his or her residence a "disallowed party", who then participates in the phone call after the phone is initially answered by the allowed party. Another way in which inmates circumvent the limited-dialing restrictions of modern prison phone systems is to make a phone call to a friend who has three-way calling, and then have that person conference in a person at another telephone number (which is not approved for the prisoner to be dialing). Another way that inmates circumvent the dialing limitations is to have someone at an allowed number set their phone to call-forward to another number (which is not approved for the prisoner to be dialing). One brand of prison phone systems boast a "third-party-call-indicating click detector" feature, which is designed to detect a set of supposedly telltale click sounds on the line when a third party is conferenced on to the line. Such detectors are unfortunately unreliable at best, because many modern telephone systems don't create any particular noises on the line when conferencing in a third party, or when forwarding a call to another number, but none the less, prison officials have been motivated by the promise of such systems enough to purchase phone system upgrades. Indeed, word of the existence of such systems has spread among inmates, along with the belief and story that if inmates in a conversation (where a third party is being conferenced in) are making enough noise at the time of the conferencing clicks, then the system will not detect the clicks.

To continue to market "conference call click detecting" systems to prisons in the face of such stories, manufacturers of such systems have utilized phone system hardware that separates the electronic signals produced by the phone the inmate is talking on at the prison, from the electronic signals coming in from the outside phone network. Telecommunications with the incoming and outgoing signals separated is sometimes referred to as four-wire telephony (in contrast to the two-wire telephony systems typically used in homes, where incoming and outgoing signals share the same pair of wires). We will also refer to this four-wire technique in this document as "telephonic directional separation". When click detection algorithms are run on only the signals coming in from the outside phone network, clicks can be detected (if they exist) regardless of how much noise a prisoner makes on a phone at the prison. In addition to click detection methods, tone detection methods such as those described in U.S. Pat. No. 5,926,533 (which is herein incorporated by reference) are known in the art. However, if a given outside phone system accomplishes call conferencing without creating clicks or tones, the call conferencing can not be detected through click or tone detection. There is a need for innovative technology which can detect conference calls in situations where no tell-tale clicks or tones are present.

A compounding problem facing corrections facilities today is that detecting and automatically disconnecting a call based on the fact that it is a conference call or a forwarded call may not be the right thing to do in some circumstances. For instance, if someone an inmate is allowed to call at home sets his home phone to forward to his cell phone if he doesn't answer at home, the call should be allowed to go through. Likewise, if one person an inmate is allowed to call wants to conference in another person that the inmate is allowed to call, such a call should not be automatically disconnected. There is a need for innovative technology which will not interrupt conference calls and forwarded calls which should be allowed to take place, while automatically disconnecting instances of call forwarding and conference calling which should not be allowed to take place.

Another problem facing the management of corrections facilities today is that a service has become available which allows automated voice-prompted call forwarding, including spoofing a false caller ID number. This service (if dialed by an inmate directly of reached by an inmate through call forwarding or a three-way call) allows the inmate to verbally speak a number to be dialed, and verbally speak a caller ID number to be spoofed. The service then patches the inmate through to the number to be dialed, and the caller ID number seen by the person at that number is the spoof number verbally specified by the inmate. Such systems will be referred to in this document as verbally programmed re-dialers. There s a need for innovative technologies to combat the use of verbally programmed re-dialers by inmates.

Another potential problem which is of concern to some institutions is the potential for employees of the institution to release to unauthorized persons copies of recorded phone calls. This may be of concern, for instance, regarding phone calls placed by "celebrity" inmates. There is a need for innovative technologies which will help correctional institutions combat unauthorized release of call recordings to unauthorized persons.

The quantity of phone calls made on a daily basis from modern correctional institutions is large, and even though many correctional institutions record all phone calls made by inmates, it is a financially infeasible task to manually review, spot monitor, or manually spot review all phone calls made, and even if such manual monitoring were feasible, persons monitoring the calls would be unlikely to know if a given call was forwarded to someone at a different number than the number that was dialed, and the entire call might have to be listened to in order to detect an instance of conferencing in a third party. There is a need for more automated monitoring with innovative features which would statistically allow a high degree of accuracy in pinpointing phone calls which went to an un-allowed party.

Even when inmates are talking to allowed parties, it is desirable to prevent inmates from facilitating illegal activity via their phone calls. Techniques (such as described in U.S. Pat. No. 6,064,963, which is herein incorporated by reference) are known in the art for automatically spotting key words in conversations. Unfortunately it can be difficult to know what key words to look for, because inmates know that all their calls are being recorded, so they may be unlikely to speak about prohibited subjects in a directly obvious manner. Even if prison officials reviewed all of every phone call made, it would be challenging to figure out the meaning of what was being said if part or all of the conversation were essentially in code. There is a need for technological advances which can aid prison officials in detecting phone calls about prohibited subjects, and there is a need for technological advances which can provide prison officials with clues to help decipher conversations which are partly "in code".

Correctional institutions are not only responsible for preventing inmates from engaging in illegal and/or harmful activities, they are also charged with rehabilitating inmates. One key factor which can aid in rehabilitating inmates is monitoring each prisoner's psychological state of mind. Monitoring inmates' phone calls can give excellent clues to inmates' states of mind, but prisons don't have the budget to have even unskilled personnel monitor the majority of phone calls made, and the level of training and attentiveness that would be required to monitor the majority of phone calls and keep psychological notes is not reasonably feasible for prisons to expend. There is a need for innovative technology and automated systems to help prison officials track the psychological states of mind of inmates.

Another challenge facing prison officials is the challenge of maintaining certainty about who is making which calls. Although many modern prison phone systems require a prisoner to enter a PIN to make calls, it is still possible for inmates to share PINs with each other, which gives them access to dialing numbers which are not on their "allowed phone number" list. There is a need for more reliable ways for prison officials to be able to detect when inmates are directly dialing non-allowed phone numbers by using identifying information of other inmates. It has been proposed to use digital signal processing Speaker Identification techniques (such as those described in U.S. Pat. No. 6,519,561, which is herein incorporated by reference)) in place of PINs to identify which inmate is making a call, but speaker identification technology is nowhere near as reliable as fingerprinting, so such an identification system has not been deemed a viable substitute for PINs.

Speaker recognition technology relies on extracting from human speech certain characteristics of the fundamental vibration rate of the speaker's vocal chords, and certain information about the resonances of various parts of the vocal tract of the person speaking, which are indicative of the physiology of that particular person's vocal tract. There are two problems that lead voiceprints to be far less individuated than fingerprints. The first problem is that there is not as much variation in the physiology of typical people's vocal tracts to provide as rich a differentiation as fingerprints provide. The second problem is that each given person's vocal tract characteristics actually vary in a number of ways depending on time of day, how much the person has been talking that day and how loud, whether or not the person has a cold, etc.

Some modern prison phone systems use voice verification in conjunction with PINs, to make it more difficult for one inmate to falsely identify himself as another inmate. Voice verification has less stringent requirements than voice identification. In voice verification, the system is typically simply ensuring that the person speaking a pass phrase has a voice that is "close enough" to the voice characteristics of the person who's PIN is used. Even with voice verification augmenting PIN usage, one inmate might "share his identity" with another inmate, by entering his PIN and speaking his pass phrase, and then handing the phone off to another inmate. Or an inmate may use a pocket dictation recorder to record another inmate's pass phrase, and then play it into the phone at the appropriate time. There is a need for more robust inmate identification technology which prevents one inmate from "handing off" his identity to another inmate in a way that would allow the other inmate to make calls to numbers which he would otherwise not be allowed to call.

The only data most modern prison phone systems keep track of and make easily searchable are records of numbers dialed, and time, date, and duration of calls, inmate who originated the call, reason for call termination (regular termination, 3-way call termination, out-of-money, etc.), type of call (collect, prepaid, debit, etc.). There is a need for tracking innovative metrics which allow prison officials to more accurately pinpoint which call recordings are worthy of human review, and speech-to-text technologies only partially address this need. It may for instance be desirable to detect when an inmate is giving orders or threatening someone. This may be difficult to do from vocabulary alone, especially since the prisoner knows the call is being monitored, and may therefore speak "in code". There is also a need for innovative technologies which offer real-time detection of prohibited calls (through detection of non-allowed call participants, and/or through the nature of the dialog between the inmate and the called party or parties), and there is the need for a system which offers prison officials the opportunity to quickly make a decision in real time as to whether a given call should be interrupted, and interrupt the phone call if needed based on real-time content of the call.

The quantity of phone calls made in prisons on a daily basis is enormous. Even the quantity of such phone calls which might contain conversations which merit attention by investigators is substantial. There is a need for innovative technologies which can present in an easily graspable form a summary of calls which might merit investigation. There is a further need for innovative technologies which can sort calls by criteria relevant to why the calls might merit investigation, and "how strongly" such calls might merit investigation.

Customer Service Market

In the customer service industry, it is common for all calls to be recorded, and for a cross-section of calls to be monitored live and other calls to be reviewed later with the aim of furthering the training of customer service representatives, and increasing customer retention. The increased use of Interactive Voice Response (IVR) systems in the modern customer service industry has in many cases exacerbated the frustration that consumers experience, because one is often communicating with a computer rather than a person when initially calling a customer service department. Some companies have recently made available software designed to detect frustration on the part of consumers dealing with customer service departments. There is a further need for innovative technologies which can aid in real-time detection of live conversations (between customers and customer service agents) that are "not going well", so that customer service agents have their situational awareness increased, and/or customer service supervisors can intervene, possibly saving valuable customer loyalty. There is also a need for innovative technologies which can give customer service agents feedback and coaching to help them deal more effectively with customers.

As in other industries where large numbers of phone calls are monitored, today's technology makes it easy for a company to record and archive all customer service phone calls, but technologies are lacking in the area of automatically sorting recorded calls and flagging which ones are good candidates to be listened to by persons aiming to glean critical information, or insights which could be used to improve customer service. One challenge facing customer service call center managers is finding a way to usefully keep easily searchable records containing relevant data about recorded phone calls. Companies such as CallMiner, Inc. have begun to make products and services available which use Large-Vocabulary Continuous Speech Recognition (LVCSR) speech-to-text conversion to convert archived audio to text. While today's large-vocabulary continuous speech recognition technology has achieved reasonable accuracy when trained for a particular user, it is far less accurate in converting speech for users for who's speech the system is not trained, and further accuracy problems crop up when converting speech of more than one person in a multi-party conversation. Never the less, products and services such as those offered by CallMiner, Inc. have reached the point where their phrase and word searching functions have been deemed useful by many customer service groups.

In some customer service departments, recording of customer service phone calls also serves the purpose of legal documentation. This is true, for instance, in financial institutions such as banks and brokerages.

Speech Processing

Computational techniques of converting spoken words to text or phonemes (speech recognition), and techniques for identifying a person by voice automatically (speaker identification) and techniques for automatically verifying that particular person is speaking (speaker verification) typically employ techniques such as spectrographic analysis to extract key features of different people's voices. The following two paragraphs are included to familiarize the unfamiliar reader with some terms and graphical representations used in spectrographic analysis.

A black & white spectrogram of the utterance "phonetician" (the time-domain waveform of which is shown in FIG. 2) is shown in FIG. 3. The spectrogram may be thought of as being composed of a set of vertical stripes of varying lightness/darkness. Each vertical stripe may be thought of as representative of the frequency vs. amplitude spectrum resulting from a Fourier transform of a short time window of the time-domain waveform used to derive the spectrogram. For instance, the spectrum of a short time slice starting 0.15 seconds into the utterance who's spectrogram is depicted in FIG. 3 (representing the spectrum of the beginning of the "o" vowel in "phonetician") may be represented either by the graph in FIG. 4 or by the vertical stripe 300 of the spectrogram in FIG. 3. The dark bands of vertical stripe 300 may be thought of as representing the peaks of the spectrum in FIG. 4. Thus a spectrogram represents a series of spectral snapshots across a span of time. An alternative way of representing a spectrogram is shown in FIG. 6, where the sequential time slices are assembled in a perspective view to appear as a three-dimensional landscape.

The peaks in the spectrum in FIG. 4 (or equivalently, the dark bands in stripe 300) are referred to as the formants of speech. These peaks fall on harmonics of the fundamental vibration rate of the vocal chords as the speaker pronounces different utterances, and their relative heights and how those relative heights change throughout speech are indicative of the physiology of the particular speaker's vocal tract. Both the fundamental vibration rate of the vocal chords (shown in FIG. 3 over the time span of the utterance of FIGS. 2 and 6) and the relative amplitudes of the speech formants vary over time as any given speaker speaks. Speaker recognition and speaker verification utilize the differences between the spectral characteristics (including variations over time and different utterances) of different peoples voices to determine the likelihood that a particular person is speaking Various techniques are known in the art for extracting from a speech sample spectral data which may be viewed as indicative of identifying characteristics of the speaking person's vocal tract. Such data is commonly referred to as a voice print or voice signature. The fundamental vibration rate of a given person's vocal chords (and certain other geometric characteristics of that person's vocal tract) can and often does vary with time of day, length of time the person has been continuously talking, state of health, etc. Thus voiceprints are not as invariant as finger prints.

Speech recognition technologies for use in such applications as speech—to-text conversion have been commercially available in products such as Dragon Naturally Speaking™ (made by Nuance Communications Inc.) and ViaVoice™ (made by IBM) for a number of years now, and recently researchers have also begun to develop software for recognizing the emotional content of speech. The word prosody (defined at Princeton University as "the patterns of stress and intonation in a language") is often used in the field of affective computing (computing relating to emotion) to refer to emotion-indicating characteristics of speech. Prosody measurements may include detecting such speech characteristics as word rate within speech, perceived loudness, sadness, happiness, formality, excitement, calm, etc. Perceived loudness is distinguished here from absolute loudness by the way the character of someone's voice changes when he or she yells as opposed to talking normally. Even if someone used a "yelling voice" quietly, one would be able to understand that the voice had the character of "yelling". Within this document, we will expand the meaning of the word prosody to include all non-vocabulary-based content of speech, including all emotional tonal indications within speech, all timing characteristics of speech (both within a given person's speech, and timing between one person in a conversations stopping speaking and another person in the conversation speaking), laughter, crying, accentuated inhalations and exhalations, and speaking methods such as singing and whispering. References in which the reader may learn more about the state of the art in prosody detection include:

1) MIT Media Lab Technical Report No. 585, January 2005, which appeared in Intelligent user Interfaces (IUI 05), 2005, San Diego, Calif., USA.
2) R. Cowie, D. Cowie, N. Tsapatsoulis, G. Votsis, S. Kollias, W. Fellenz, and J. G. Taylor. Emotion recognition in human computer interaction. IEEE, Signal Processing Magazine, 2001.
3) P. J. Durston, M. Farell, D. Attwater, J. Allen, H.-K. J. Kuo, M. Afify, E. Fosler-Lussier, and L. C.-H. Oasis natural language call steering trial. In Proceedings Eurospeech, pages 1323-1326, Aalborg, Denmark., 2001.
4) R. Fernandez. A Computational Model for the Automatic Recognition of Affect In Speech. PhD thesis, MIT Media Lab, 2004.
5) H. Quast. Absolute perceived loudness of speech. Joint Symposium on Neural Computation, 2000.
6) M. Ringel and J. Hirschberg. Automated message prioritization: Making voicemail retrieval more efficient. CHI, 2002.
7) S. Whittaker, J. Hirschberg, and C. Nakatani. All talk and all action: Strategies for managing voicemail messages. CHI, 1998.

The above references are herein incorporated by reference.

Within this document, the terms "voice print", "voice signature", "voice print data", and "voice signature data" may all be used interchangeably to refer to data derived from processing speech of a given person, where the derived data may be considered indicative of characteristics of the vocal tract of the person speaking. The terms "speaker identification" and "voice identification" may be used interchangeably in this document to refer to the process of identifying which person out of a number of people a particular speech segment comes from. The terms "voice verification" and "speaker verification" are used interchangeably in this document to refer to the process of processing a speech segment and determining the likelihood that that speech segment was spoken by a particular person. The terms "voice recognition" and "speaker recognition" may be used interchangeably within this document to refer to either voice identification or voice verification.

In order for the voices of a given person to be identified or verified in voice identification processes, a sample of that person's speech must be used to create reference data. This process is commonly referred to as enrollment, and the first time a person provides a speech sample is commonly referred to as that person enrolling in the system.

There are several ways that voice recognition algorithms can be thought of as testing a given person's voice to see if it matches a previously stored voice print. The first way is that the voice print data can be thought of as a numerical vector derived from the reference speaker's voice. A second numerical vector can be derived in a like manner from the voice under test, and a numerical algorithm can be used to compare the two vectors in a way where the comparison produces a single number that has been found to be indicative of the likelihood of a correct match.

Since the absolute likelihood of a correct match is not independent of the voices of all the people who might be tested who are not a match, a more useful method compares the voice signature of the person being tested to voice signatures from a number of other individuals, or to an average voice signature derived from a number of people. The likelihood that the voice signature under test is the voice that was used to derive the reference voice signature is then derived from the extent to which the voice signature under test matches the reference voice signature better than it matches other individual voice signatures, or the extent to which the voice signature under test matches the reference voice signature better than it matches the "average" voice signature of a population.

A third way that voice recognition algorithms can be thought of as testing a given person's voice to see if it matches a previously stored voice print is that the stored voice print may be thought of as a model which is repeatedly tested against over time using small samples of the voice under test, and the resulting test scores are averaged over time. This procedure may be used with one of the above methods to produce a likelihood score which has more certainty the longer the speech under test is listened to. This variable sample length method may have advantages in live monitoring applications and in applications where it is desirable not to waste computational resources once a desired certainty level has been attained.

SUMMARY OF THE INVENTION

It is an object of the present invention to facilitate the investigation of networks of criminals, by gathering associations between phone numbers and voice print data and names of persons reached at those phone numbers.

It is a further object of the present invention to provide innovative technologies to help prisons combat the use of verbally programmed re-dialers by inmates.

In one aspect, the present invention requires both inmates and called parties to state the name of the called party before being connected, and both stated names are converted to text. Spoken names, voice model data from spoken names, and text-converted spoken names are saved in the call database of the institution recording the call. In a preferred embodiment, phone numbers dialed, spoken names, voice model data from spoken names, and text-converted spoken names are saved in a centralized database (outside of any particular institution) as well, to provide the ability for one institution to access phone number/voice data/name pairings recorded by other institutions, to aid in investigations and the uncovering of criminal associations.

In another aspect, the present invention improves on the practice (common in many prisons) of allowing visitation phone calls without identifying visitors in the phone call. In one aspect, the present invention has inmates identify themselves by PIN and/or spoken name, and identify visitors by name when dialing. In another aspect, the present invention has visitors identify themselves by name before being connected to the inmate they wish to talk to. In a preferred embodiment, both the prisoner's enunciation of the visitors name and the visitor's enunciation of his or her own name are recorded and converted to speech. Additionally, brief voice model data is derived from the visitor's enunciation of his or her name, and more precise voice model data is derived from subsequent speech of the visitor during the phone call. In a preferred embodiment, these derived data are stored in the institution's call database, building over time a set of voice models, recorded enunciated names, and test-converted names associated with persons with whom a particular inmate converses. In a preferred embodiment, photographic images taken of visitors during visitation conversations are also stored in the institution's call database.

In another aspect, the present invention allows investigators to listen to phone call recordings using headphones or ear-buds where the calling party side of the line is played in one channel (for instance the left channel) and the called-party side of the line is played in the other channel (for instance the right channel). This allows intuitive discernment of whether a new voice is on the called-party side of the line or the calling-party side of the line.

In an embodiment of the present invention for use in monitoring conference calls live or reviewing recorded conference calls, automatic voice recognition of who is speaking enables graphical display of the identity of the current speaking party (by photo icon or avatar or by text name identifier, or by verbally enunciated identity in response to a key press, mouse click, or DTMF query.

In a preferred embodiment of the present invention, digital signal processing to carry out voice model comparison and other voice analytic functions is performed on a Graphics Processing Unit (GPU) card such as GPU cards used in computer gaming.

In a preferred embodiment, detection of a likely 3-way call event triggers an automated search for the identity of the 3-way-called party, and possibly automatically searches for past and/or future occurrences of a newly detected voice.

In a preferred embodiment, when the present invention detects an identity scam (PIN Sharing event) it feeds the recorded incident into its suspicious calling pattern detection system as one of a multitude of factors used by the system for uncovering covertly made potentially criminal calls.

In a preferred embodiment, the suspicious calling detection system adds to the calls suspicious score for each suspicious contributing event. Different types of events are given different weights, and the high interest class of the inmate caller may also change the weighting of an event and the total suspicious score. In a preferred embodiment, a user's work queue can be sorted by highest suspicious scoring calls, by case, or a number of other different factors. Highly Suspicious calls are automatically presented to users for investigation. If a user confirms the call as suspicious after reviewing it, the system uses the confirmed pattern to identify other historical and future similar patterns and provides an appropriate weighting to such call patterns.

In a preferred embodiment, events which contribute toward the suspiciousness scoring of a given call include:
  identity scamming detection
  3-way calls
  spoken phone number detected
  added called party
  high interest group inmate
  high interest group called party
  newly identified link
  matches historical prior confirmed suspicious calling pattern
  new called party voice seen on call.
  previously identified high interest called party voice detected
  whispering detected In a preferred embodiment, when an individual who has been an inmate at a facility (and who's voice has been enrolled in the system) leaves the facility in which he or she has been incarcerated, the system automatically begins to search for the voice of that individual on phone calls or all inmates with whom that individual had contact in the facility as an inmate, and the present invention can be configured to take automated action (such as automatically cutting off a call), or to flag the recordings of calls where inmate-to-prior-inmate conversations are detected.

In a preferred embodiment of the present invention for use in correctional institutions, rather than performing continuous or periodic voice verification during a call to detect if the voice of the inmate on the call ever becomes an unlikely match to the voice model of the inmate who placed the call, the system instead performs continuous periodic imposter monitoring, where the voice on the inmate side of the line is periodically checked against voice prints or voice models of persons who it is deemed could possibly get on the line in place of the inmate who placed the call. In a preferred embodiment, voice models of persons who have been known in the past to have perpetrated identity theft from other inmates will be preferentially monitored for. In a preferred embodiment, when an imposter is detected, the present invention may be set to perform an automated action (such as flagging the call in a particular way or cutting off the call in real time), depending on the identity of the imposter detected.

In a preferred embodiment, when conditions indicative of a 3-way call are detected when monitoring a call live or reviewing a recorded call, speech-to-text conversion is used to convert any spoken phone number and/or name detected on the line in the temporal vicinity (for instance within 30 seconds) of the detected 3-way call event. In a preferred embodiment, a voice model is made of any new person to join the conversation during the detected likely 3-way call event, and statistical pairings are built up over time in both the call database of the institution, and in a centralized database whish spans many institutions. Thus over time the present invention enables law enforcement officials to build a database of the names and phone numbers of individuals who inmates illicitly call through three-way call events, call forwarding, and the like. If on one call the phone number and voice are both detected, the centralized database now "knows" that pairing. If on another call the name and voice are paired, the two events are automatically correlated and now the phone number, voice model, and name of the illicitly called person are all known, and in the future, detecting of the voice or number or name will suffice. In this document, methods for dealing with three-way calls and illicitly forwarded calls will be deemed interchangeable in most cases.

In a preferred embodiment, automated dialing means or SS7 telephone network query means may be used to verify the "busyness" of a phone supposed to be involved in an illicit (3-way or call-forwarded) call detected to be likely in real time. In addition, automated or human-assisted dialing of a the previously verbally detected phone number of an illicit call participant may be used to get a verifying sample of the voice or voices of persons who can be reached at that phone number.

A preferred embodiment of the present invention allows officials using the present invention to create 3-way voice searches (searches for other calls on which voices detected during 3-way call events are detected). A preferred embodiment also allows users to search and label called party voices with phone numbers and names so that the rest of the system's call intelligence can be brought to bear on the 3-way call. A preferred embodiment of the present invention can be set to automatically search forward and/or backward in time for other occurrences of a voice detected during a likely 3-way call event, wither only in other calls of the inmate involved, or across calls of a number of inmates, to discover if some 3-way-called numbers and/or persons are in common to a-way call events detected on multiple inmates' calls.

A preferred embodiment of the present invention employs directional microphones or an array of microphones which may be post-processed or real-time-processed to effectively act as one or more directional microphones, to monitor conversations of inmates in the vicinity of inmate phones while other inmates are engaged in conversations on those phones. In a preferred embodiment, the present invention may additionally or alternately use electronic cameras to monitor inmates in the vicinity of inmate phones. In a preferred embodiment, directional audio monitoring of inmates in the vicinity of phones is used to automatically detect instances where one inmate (who is on the phone) is acting as an intermediary for another inmate who is prohibited from talking to the person who the inmate on the phone is allowed to talk to (and is talking to). In such a case, the voice of the disallowed inmate is recorded through a physically directional microphone (or electronically directional array of microphones), and stored in a manner linked with the recording of the phone call that took place at the same time. In a preferred embodiment, the identity of inmates in the vicinity of the inmate who is on the phone may be automatically derived from voice parameters or photographically, or may later be manually derived photographically.

In another aspect, the present invention automatically detects the interactive voice response cues of verbally programmed re-dialers, and may be configured to foil inmate attempts to use such systems. In one configuration, the present invention may be set up to automatically terminate calls on which the automated IVR voice of such systems is detected. In a preferred embodiment, such automatic termination takes place after the inmate has already spoken the number to be dialed (and possibly the caller ID to be spoofed), and before the call actually goes through. In a preferred embodiment, call termination can be programmed to take place in a way that the inmate will likely interpret as a dropped call or an IVR interface failure, rather than an intentionally terminated call. Thus the present invention can be programmed to "spoof call failure" until officials decide whether it would be more useful to let a call to the specified number go through (for instance, to further an investigation). A preferred embodiment of the present invention flags all inmate calls during which automated IVR voices are detected, and automatically converts to text numbers spoken my inmates and numbers spoken back to inmates by IVR systems. In a preferred embodiment, a centralized database of such detected numbers is maintained, and the identities of persons at those numbers and the identities of persons who have been dialing those numbers is maintained in a corre-lated manner in that database. Automated IVR voices may be detected either by building a voice model for each IVR voice, or detecting certain known prompts, or by detecting the parametric consistency of an IVR voice, or the like.

In a preferred embodiment of the present invention, when use of a verbally programmed re-dialer is detected, the present invention has the capability to blank the audio to the inmate's side of the line while automatically programming the verbally programmed re-dialer to dial a different number than the one spoken by the inmate. The inmate experiences an unusual delay but does not know what has happened. One preferred embodiment then allows an investigator to converse with the inmate through voice-disguising software which may be tuned to mimic the voice characteristics of the person the inmate was attempting to dial.

In another aspect, the present invention may be configured to repeatedly steganographically embed user-identifying information in the audio stream of any recording or live call being streamed to any user. This feature is intended to help institutions track down users who release phone call audio to persons not authorized to have such audio.

In another aspect, the present invention supports creation of password-protected audio files and encrypted audio files when audio is to be released outside of an institution within which it was recorded.

DETAILED DESCRIPTIONS OF SOME PREFERRED EMBODIMENTS

Figure 1:
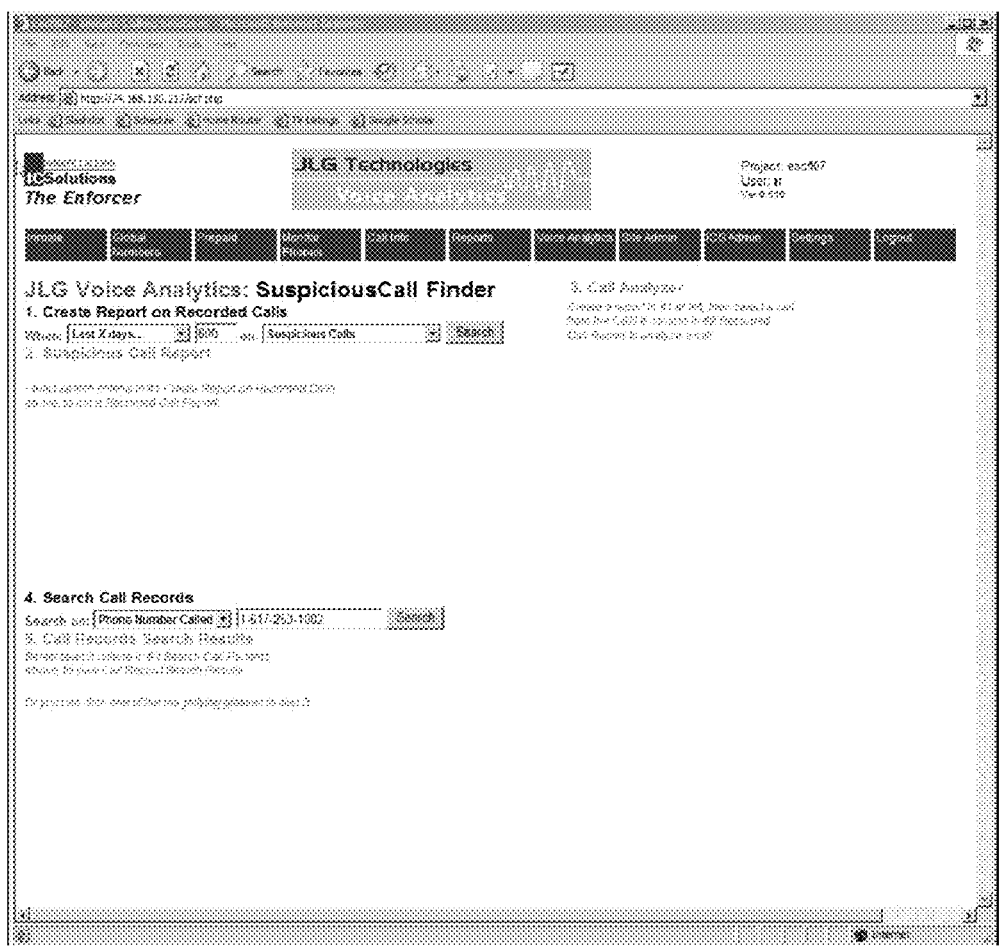
FIG. 1 is a screen shot of a graphical user interface according to the present invention, before any data is selected to be displayed.

Within this document, the terms "voice print", "voice signature", "voice print data", "voice signature data", and "voice model" may all be used interchangeably to refer to data derived from processing speech of a given person, where the derived data may be considered indicative of characteristics of the vocal tract of the person speaking. The terms "speaker identification" and "voice identification" may be used interchangeably in this document to refer to the process of identifying which person out of a number of people a particular speech segment comes from. The terms "voice verification" and "speaker verification" are used interchangeably in this document to refer to the process of processing a speech segment and determining the likelihood that that speech segment was spoken by a particular person. The terms "voice recognition" and "speaker recognition" may be used interchangeably within this document to refer to either voice identification or voice verification.

Within this document, speech mannerisms will be deemed to include use of particular combinations of words (such as colloquialisms), frequency of use of various words (such as swear words, both as modifiers for other words, and not as modifiers), frequency and context of use of words and sounds some people use as conversational filler (such as the sound "aah", or the word "like"), phrases which may be habitually used to start speech segments (such as the phrase "OK", or the word "so"), regional accents, elongation of pronunciation of words (for instance where the elongation may indicate a state of mind such as contemplation), etc.

Within this document, the term "enrolled participant" will refer to a participant who's voice or other biometric identifying data (such as fingerprint data, retina scan data, or photographic data) is enrolled in the system, who has been recognized by the system as enrolled. In applications of the present invention concerned with identifying conversation participants or controlling in some way who participates in a conversation, the terms "allowed" and "authorized" when used to describe a conversation participant will refer either to a conversation participant who's voice or other biometric identifying data is recognized as enrolled in the system (and who is authorized to participate in a given portion of a conversation without an automated action being taken), or a conversation participant who is identified as part of a class of participants (such as women, or men, or persons who's voice or other biometric identifying data is not recognized), and who, based on his or her individual identity or class identity, is permitted to participate in a given portion of a conversation without an automated action being taken (such as an alert being generated and/or an automated message being played and/or a call being disconnected).

Within this document, the terms "unauthorized" and "unallowed", when used to describe a conversation participant, will refer to persons who have not been identified as "allowed" or "authorized". Within this document, the term "disallowed", when used to describe a conversation participant, will refer either to a conversation participant who's voice or other biometric identifying data is recognized as enrolled in the system, or a conversation participant who is identified as part of a class of participants (such as women, or men, or persons who's voice or other biometric identifying data is not recognized), and who, based on his or her individual identity or class identity, is prohibited from participating in a given portion of a conversation.

Within this document, the term "inter-prosodic" shall refer to all non-vocabulary-based characterization of the quality of conversation between two or more persons. For instance a conversation between two people might be characterized as confrontational, friendly, teaching, order giving/taking cooperative, etc. The term "trans-prosodic" within this document shall refer to non-vocabulary-based patterns of the quality of a given speaker's speech across a substantial portion of a conversation or lengthy speech segment (for instance, across a portion of a conversation or speech segment long enough for an emotional pattern to be distinguishable).

Within this document, the term "key-phrase" shall be used to denote any word, phrase, or phonetic utterance which one might wish to detect or search for in a conversation. Within this document, the term "call control official" shall be used to refer to any person who has the authority to interrupt a phone call which is in progress. Such interruption could be by joining the call, temporarily disconnecting one or more parties from the call, disconnecting the entire call, or disabling one or more parties ability to be heard on the call.

In a preferred embodiment, when a user of the graphical user interface of the present invention first sits down to use the system, he sees a screen such as the one shown in FIG. 1, which may usefully be thought of as consisting of five regions as follows: Call Report Selection Area 101 allows the user to select a span of time and a type of calls to display over that span of time. Call Report Area 102 contains a note that this area will be used to display the call report on the data selected in Call Report Selection Area 101. Call Analyzer Area 103 contains a note that this area will be used to display a table of information relevant to whatever call is selected on the call report table which will be generated in Call Report Area 102. Call Records Selection Area 104 allows the user to select a set of call records via menu criteria such as phone number, inmate ID, etc. Call Records Area 105 contains a note explaining that a table of call records will be generated in that area given criteria specified in Call Records Selection Area 104.

Figure 2:
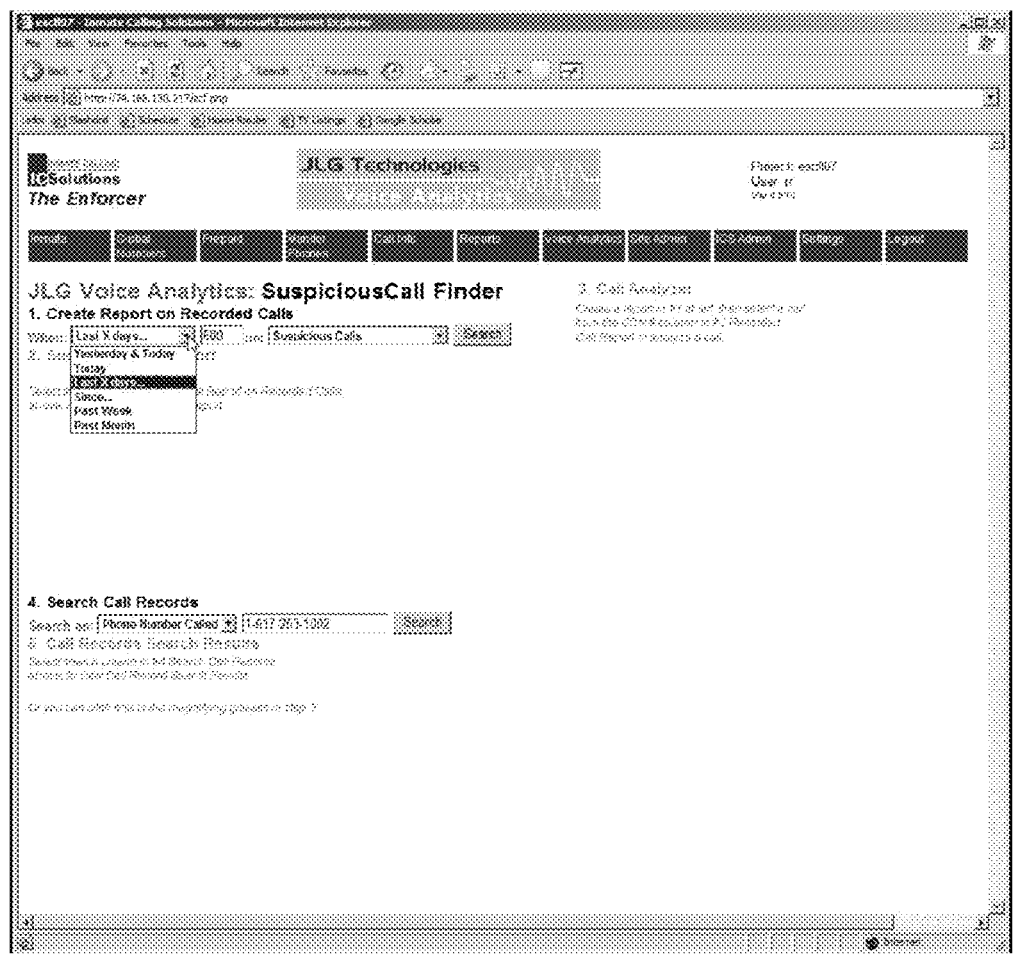
FIG. 2 is a screen shot of a graphical user interface according to the present invention, showing an example menu of possible ways of selecting a span of time over which to analyze phone calls.
Figure 3:
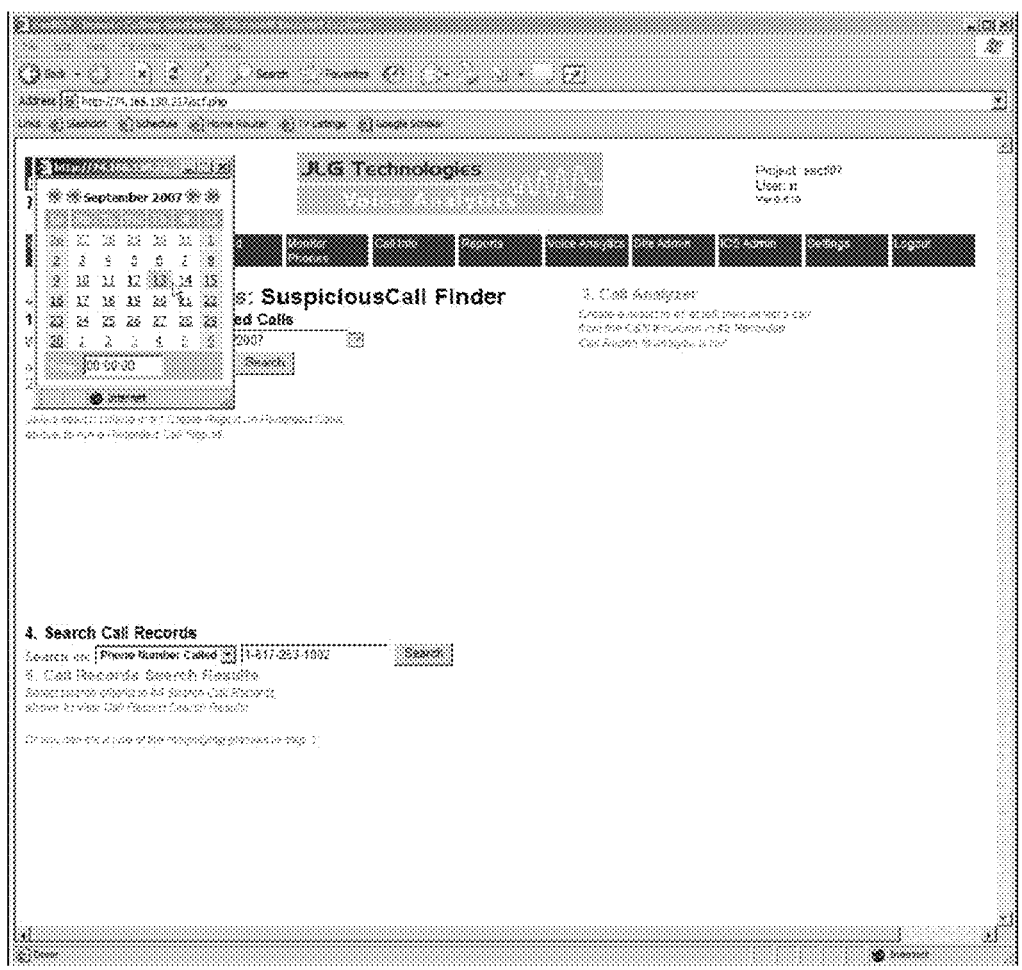
FIG. 3 is a screen shot of a graphical user interface according to the present invention, showing a pop-up calendar which may be used as an aid to selecting a range of time over which to analyze calls.

FIG. 2 shows how time-span menu 200 expands (showing selectable options) when time-span menu drop-down arrow 201 is clicked. In a preferred embodiment, time-span menu 200 contains selections "Yesterday and Today", "Today", "Last X days", "Since . . . ", "Past Week", and "Past Month". Depending on which selection is chosen, dynamically generated additional time-span data box 202 will appear. For instance, if "Today" is selected, box 202 will not appear, whereas if "Last X days" is selected, data box 202 will appear. If "Since . . . " is selected, dynamically generated pop-over calendar 300 will appear, as shown in FIG. 3.

Pop-over calendar 300 may also include time field 301, into which a user may type a time of day, if desired. In an alternate embodiment, time span menu 202 may include a "Between" selection, and a time range may be selected in pop-over calendar 300.

Figure 4:
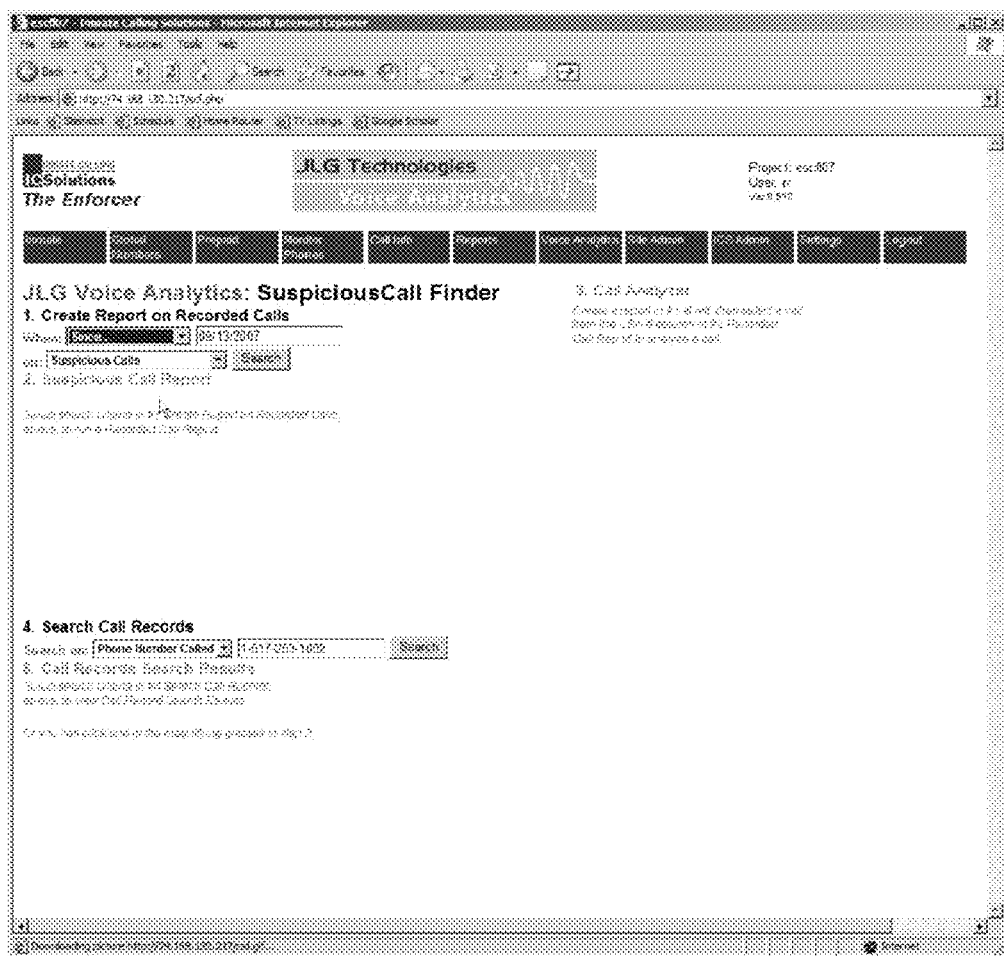
FIG. 4 is a screen shot of a graphical user interface according to the present invention, showing how the position of a second menu within the GUI may change depending on what is selected on a first menu.

Depending on what menu selection is selected from time-span menu 200, time-span data box 202 may change size and the position of other objects within the display area may change to accommodate this change. For instance, FIG. 4 shows call-type menu 400 changes position relative to FIG. 1 or 2 when "Since . . . " is selected on time-span menu 200, making time-span data box 202 increase in size to accommodate a date or date range.

Figure 5:
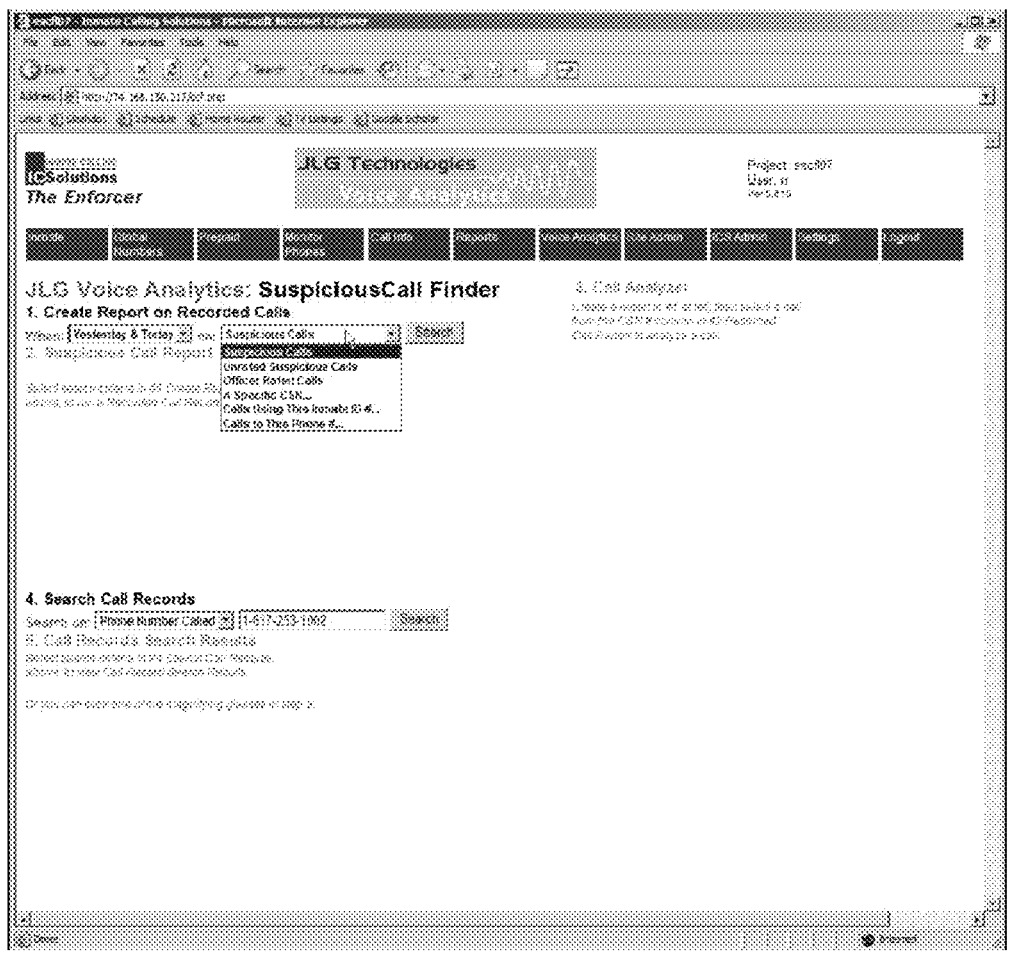
FIG. 5 is a screen shot of a graphical user interface according to the present invention, showing how a second menu is used to select the type of data to be displayed from the selected span of time.

FIG. 5 shows the selections available on call-type menu 500, which drops down when call-type drop-down arrow 501 is clicked. In a preferred embodiment, selections on call-type menu 500 include "Suspicious Calls", "Unrated Suspicious Calls", "Officer Rated Calls", "A Specific CSN", "Calls Using This Inmate ID # . . . ", and "Calls to This Phone # . . . ". If any of the selections containing " . . . " are selected, then an additional call-type data box appears, allowing the user to type additional call type data (such as a phone number, Call Sequence Number (CSN), or inmate ID number).

Figure 6:
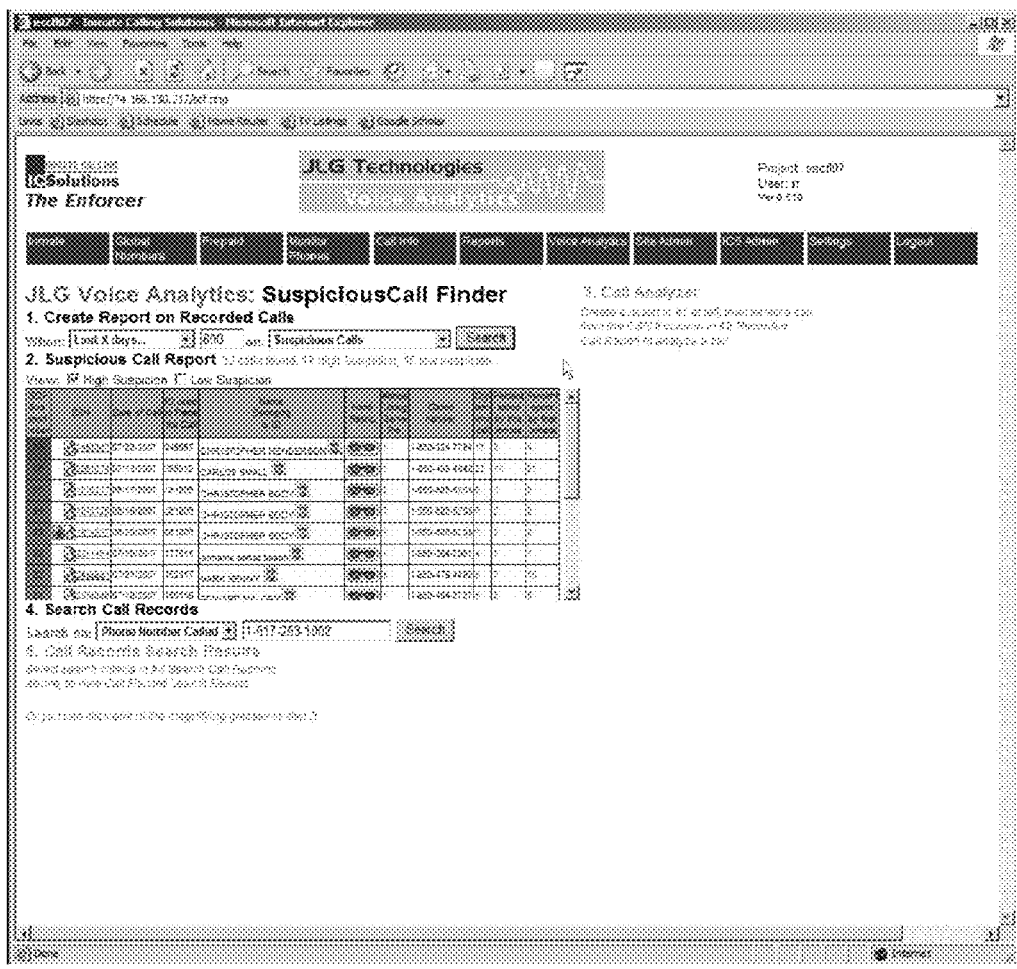
FIG. 6 is a screen shot of a graphical user interface according to the present invention, a table which was dynamically populated based on criteria specified by menu-selected time range and menu-selected type of data.

Once a user has entered time-span and call-type data, Recorded Call Search Button 600 can be clicked to dynamically generate report table 601, as shown in FIG. 6. Column 1 (the left-most column) in report table 600 is both numerically coded and color coded to indicate level of severity. For instance, in the Suspicious Call Report shown in FIG. 6, the table is sorted (from top to bottom) in order of how likely it is that the voice on the call is the voice of an imposter. The color red is used to represent a highly suspicious call, while the color green is used to represent a very-low-suspicion call.

The second column in table 601 contains the call sequence number (CSN). A unique CSN is assigned to each call made. The second column also has space for a note-denoting icon such as icon 602, which will be present if an official has entered any notes concerning the call. The third column in table 601 contains the date of the call. The fourth column in table 601 contains the ID number used to place the call. If the call is suspected to be made by an imposter, it is suspected that this number does not belong to the person who's voice is actually heard on the call. The fifth column of table 601 contains the name that goes with the ID number is column 4, plus a small icon of a man with sun glasses if it has been determined that the call was actually placed by someone else.

Figure 7:
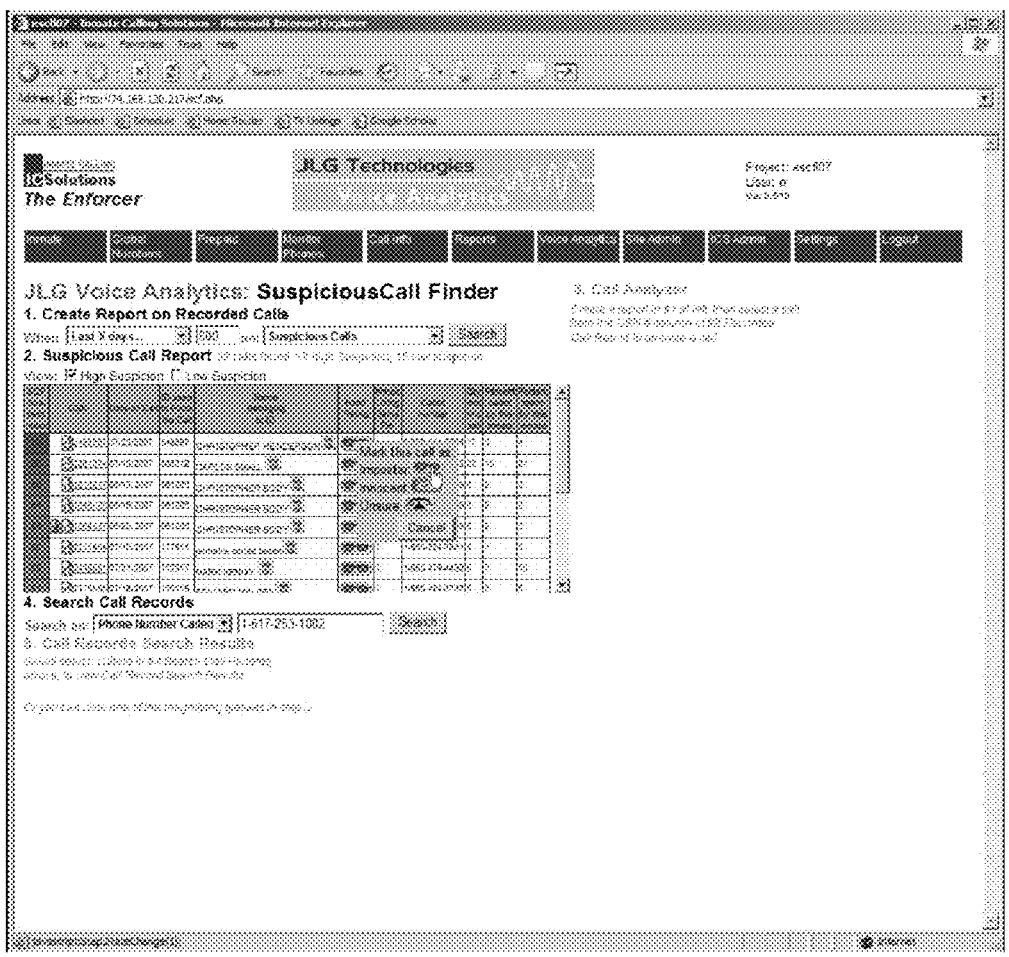
FIG. 7 is a screen shot of a graphical user interface according to the present invention, showing a pop-over graphical menu allowing an investigator to mark a call after having listened to all or part of that call.
Figure 8:
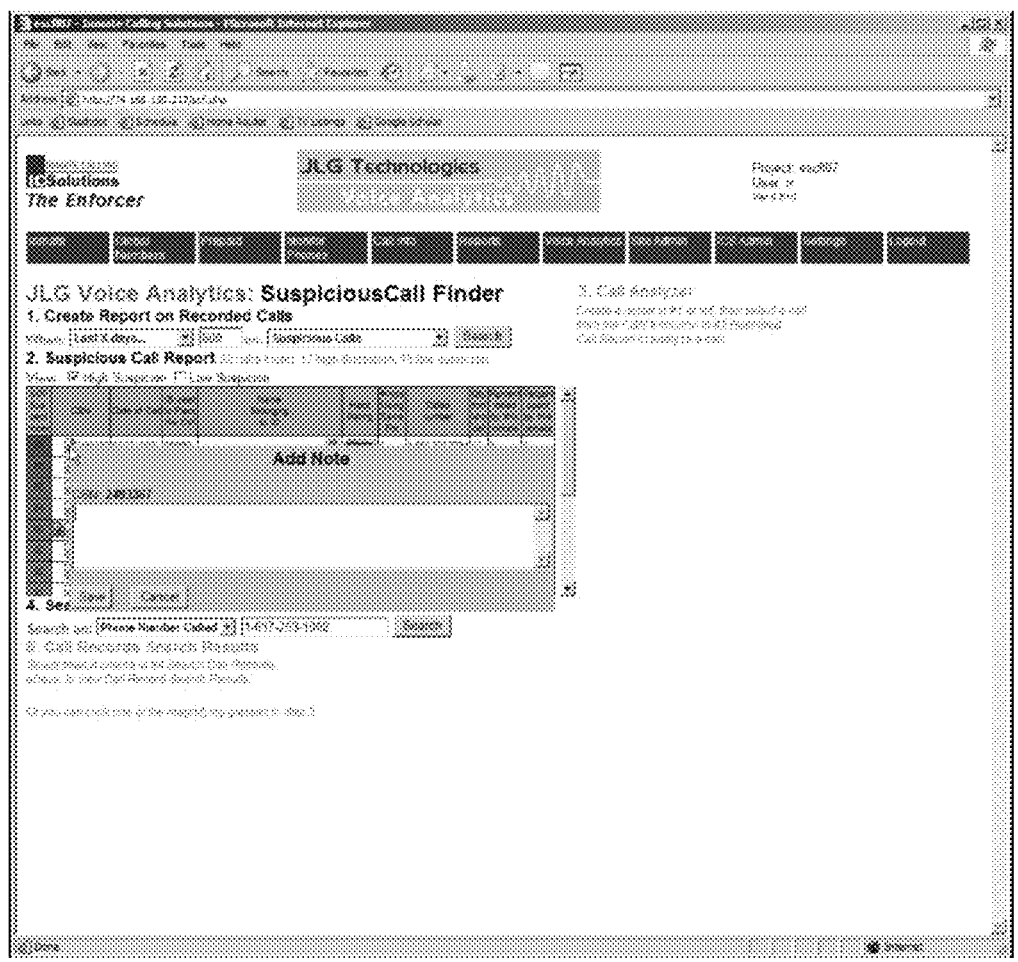
FIG. 8 is a screen shot of a graphical user interface according to the present invention, showing a pop-over note pad which allows investigators to enter notes concerning a given call.

Coolum 6 of table 601 contains icons indicating the rating status of each call. In a preferred embodiment, if a call has not been rated by an official, a question mark icon will be present. When an official listens to a call, he may right-click on the icon in column 6 of table 601, and pop-over window 700 will appear (as shown in FIG. 7), allowing the user to select a rating Icon of his choice. In a preferred embodiment, a sun-glasses icon represents the rating "imposter", a halo icon represents the rating "innocent" (not imposter), and a balance icon represents the rating "unsure" (of whether the person actually speaking on the call is the person who's ID number was used to place the call). If a user wishes to attach a note to a call record displayed in table 602, he may do so by right-clicking in column 2 of the call record, and a note window 800 will appear as a pop-over, allowing the user to type a note. In an alternate embodiment, notes may also be entered as voice annotation.

Figure 9:
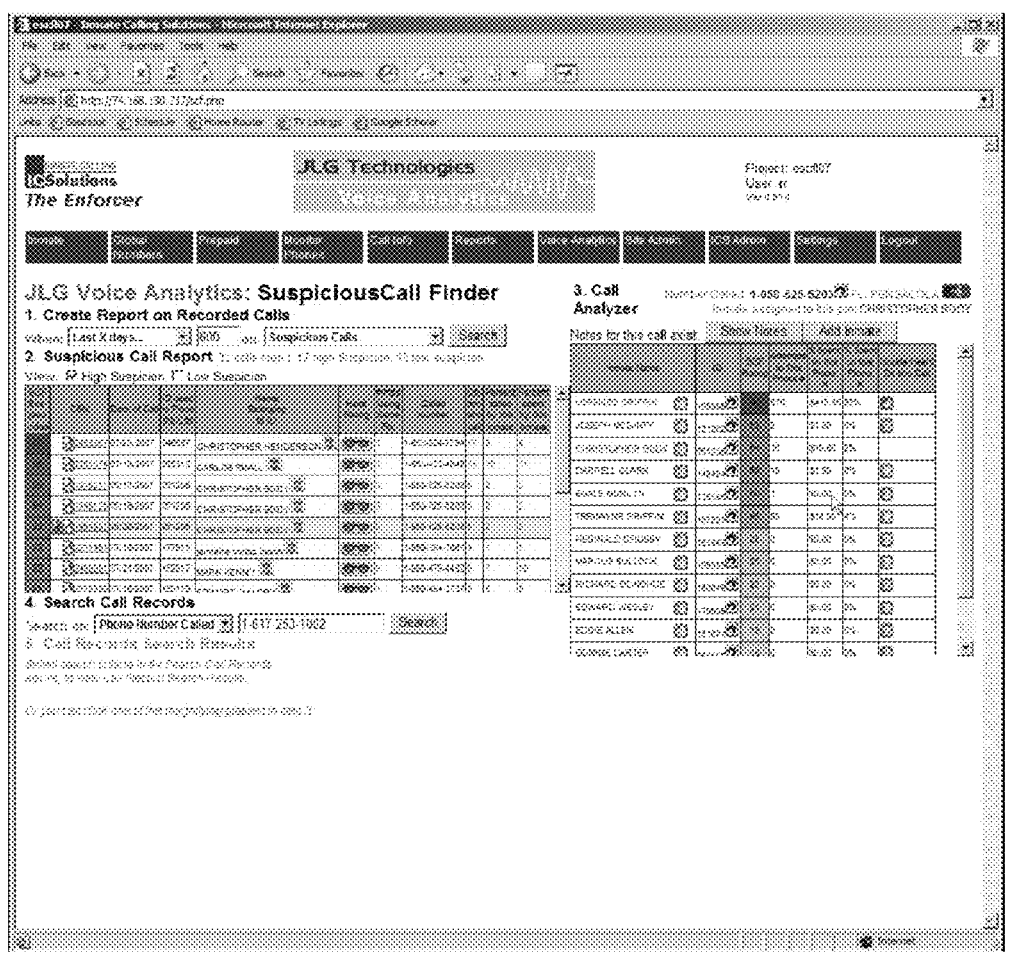
FIG. 9 is a screen shot of a graphical user interface according to the present invention, showing how a second table is dynamically populated with data about likely imposters when a given suspect call is selected.

In a preferred embodiment, when a row of table 601 is selected (for instance, by left-clicking anywhere in the row, then call analyzer table 900 is dynamically generated, and the row of table that generated table 900 is shaded as row 901 is shaded in FIG. 9. In a preferred embodiment, each row of table 900 represents a possible imposter, with the table sorted such that the most likely imposter is at the top, and successively less likely imposters appear on the rows below. Column 1 (the left-most column) of table 900 contains the possible imposter's name. Column 2 contains the possible imposter's ID number. Column 3 is a color-coded and numerically coded column containing the automatically generated Suspicious Call Finder (SCF) rating. In a preferred embodiment, the SCF rating is generated based on two factors. The first factor is the similarity of the possible imposter's voice to the voice heard on the call. The second factor is the frequency with which the possible imposter has been known to dial the number that was dialed (either under his own ID or on calls where he has previously been verified to be identifying himself as someone else).

Column 4 of table 900 contains the number of calls the suspected imposter has made to the dialed phone number in the past. Column 5 of table 900 contains the amount of money the suspected imposter has spent calling the dialed number in the past. Column 5 contains the percentage of all calls made to the dialed number which were made by the suspected imposter. Column 6 contains an icon which indicates whether the suspected imposter's voice has been verified by an official to be on the call. Note that it is possible for more than one imposter to participate in a call, so some embodiments may allow more than one "verified" icon in column 6. In a preferred embodiment, the checkmark icon, the question mark icon, and the halo icon in column 6 represent "verified imposter", "unknown", and "innocent" respectively.

Figure 10:
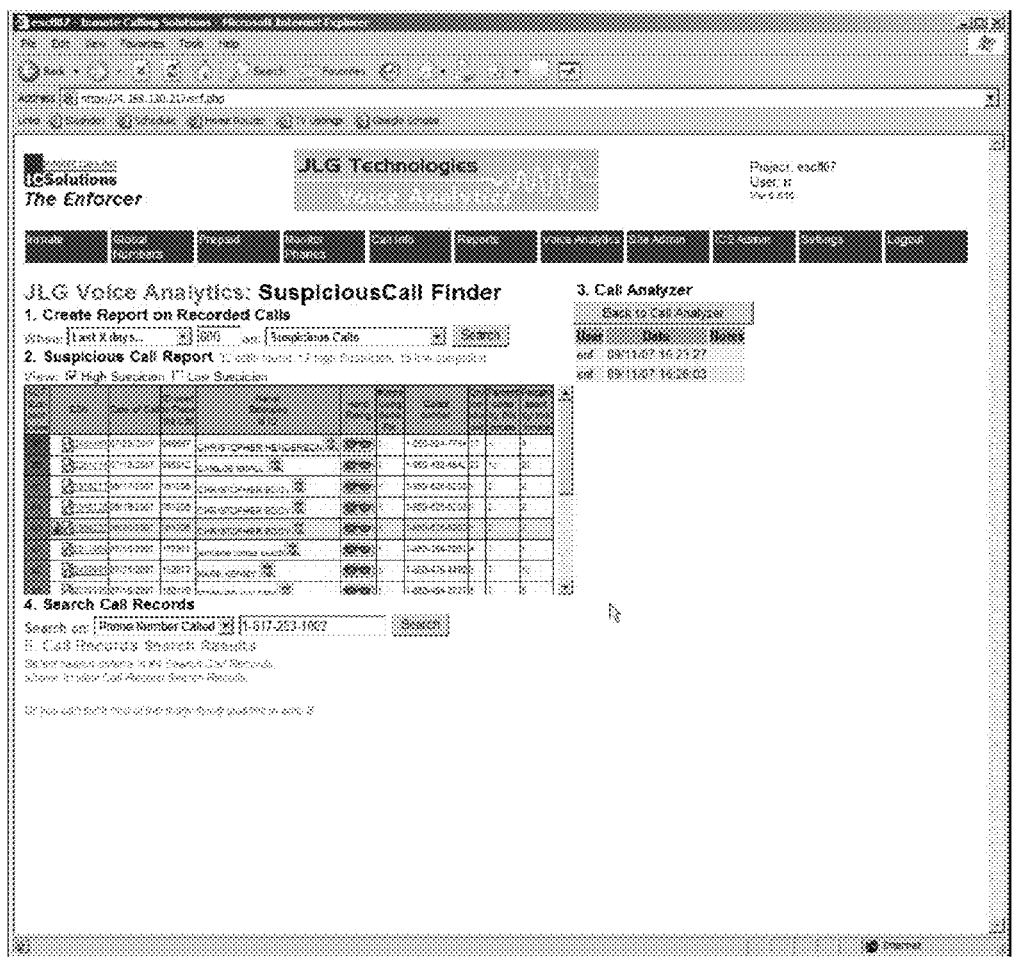
FIG. 10 is a screen shot of a graphical user interface according to the present invention, showing the suspected imposter table replaced by a table of notes on a given suspected imposter.

In a preferred embodiment, the inmates whose voices and call histories were analyzed to generate possible imposter table 900 are chosen automatically based on system records indicating who has access to the phone from which the suspicious call was placed. Sometimes records may not be updated quickly when inmates are moved, so button 901 is provided so that officials can manually add inmates to the list of possible imposters. When inmates are manually added, on-the-fly computation will be done to rate the added inmate's voice and call history to rank that inmate among the possible imposters. Notes previously entered for the call selected in table 601 may be viewed by clicking button 902. Clicking button 902 replaces possible imposter table 900 with notes table 1000 (shown in FIG. 10). The user may switch back to viewing possible imposter table 900 by clicking button 1001.

Figure 11:
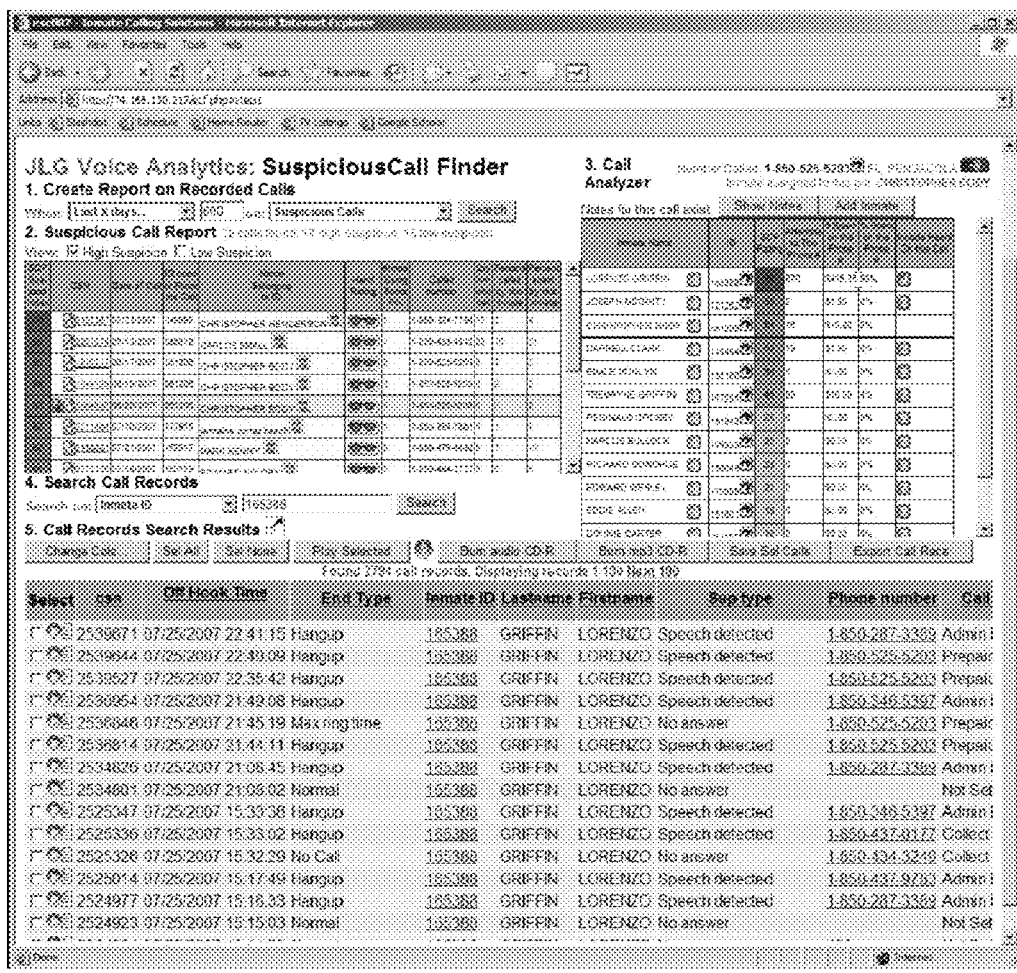
FIG. 11 is a screen shot of a graphical user interface according to the present invention, showing three dynamically generated tables (suspicious call report table, table of likely imposters concerning a selected call, and table of calls made by a selected inmate).
Figure 12:
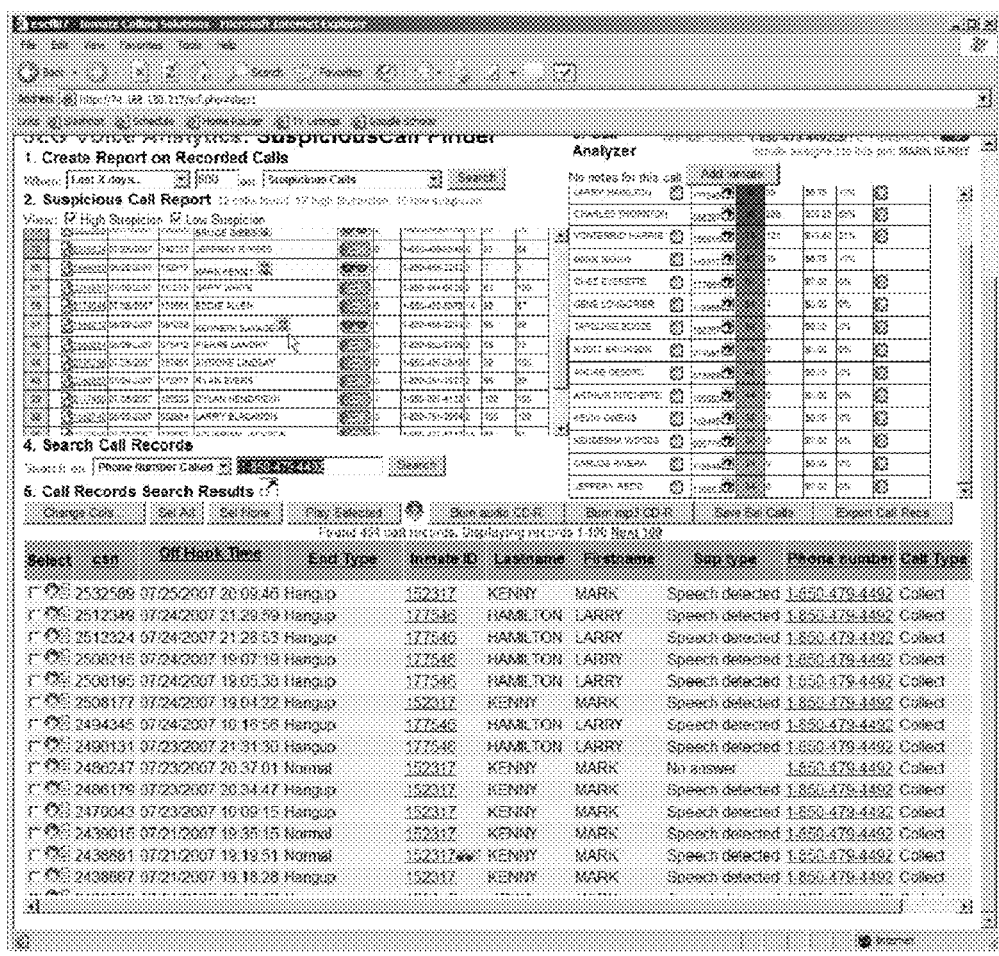
FIG. 12 is a screen shot of a graphical user interface according to the present invention, showing three dynamically generated tables, where the elevator bars to the side of the first two tables have been slid down some.

In a preferred embodiment, a third dynamically generated table 1100 may be generated by selecting a menu item from Call Records Search Menu 1101, and filling in associated Call Record Search Data Box 1102. For instance, in FIG. 11, call records table 1100 represents all the calls made by inmate number 165388, and in FIG. 12, call records table 1200 represents all the calls made to the phone number filled in in box 1102. In a preferred embodiment of the present invention, when dynamically generated tables (such as 601, 900, or 1200) do not fit in their allotted space either horizontally or vertically or both, vertical and/or horizontal elevators such as 1201, 1202, 1203 allow vertical and/or horizontal scrolling of the table which does not fit in its allotted space. Likewise, the entire display window may be scrolled by web browser elevator 1204. In a preferred embodiment, the graphical user interface of the present invention is implemented using asynchronous Java and XML (AJaX) programming standards which have evolved for websites and the like.

Figure 13:
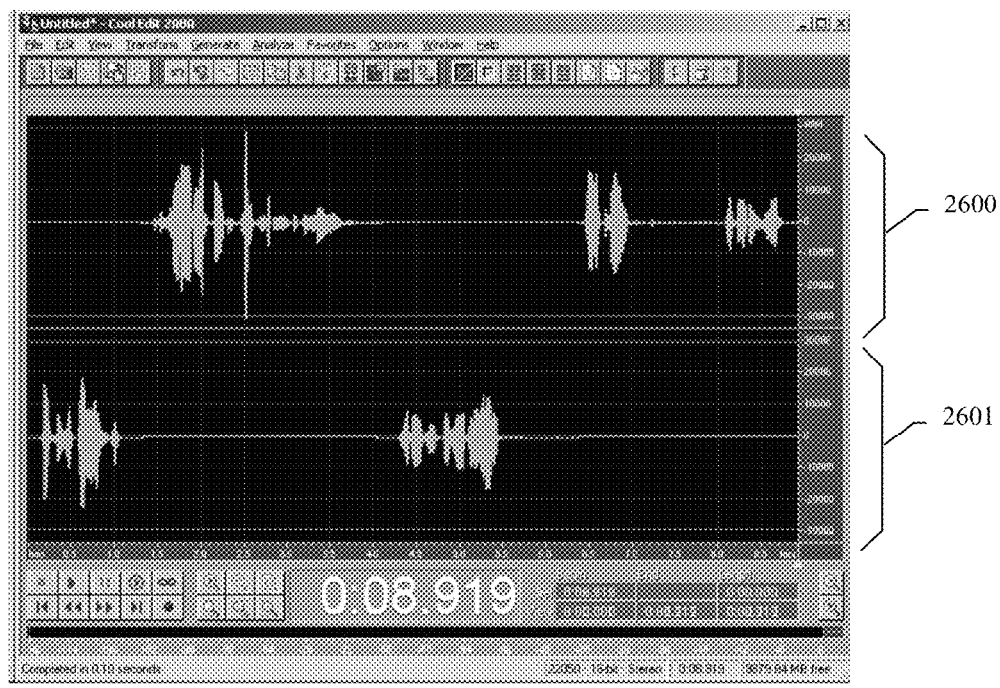
FIG. 13 depicts speech from two participants in a conversation displayed separately within a graphical user interface according to the present invention.

In a preferred embodiment for use in correctional institutions, a graphical user interface such as shown in FIG. 13 may display inmate conversation waveform 1300 and called-party conversation waveform 1301 separately.

Figure 14:
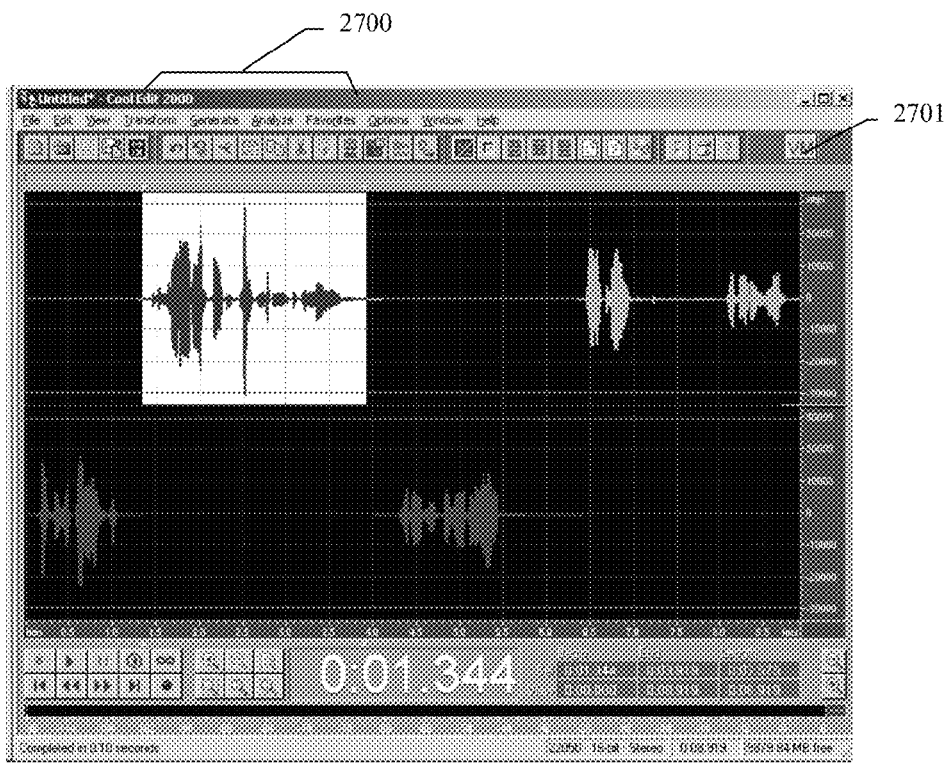
FIG. 14 depicts a speech segment from one participant in a conversation having been manually selected within a graphical user interface according to the present invention.

In a preferred embodiment for use in correctional institutions, a graphical user interface such as shown in FIG. 14 allows call review personnel to highlight a portion of a conversation participants speech (such as inmate speech segment 1400), and build a speech model, voiceprint, voice signature of the like from that segment by clicking Voice Modeling button 1401. In a preferred embodiment, this function leads to a dialog box which allows the user to build a voice model or voiceprint, and store any voice model or voiceprint produced for further use. A preferred embodiment of the present invention allows automated searching of past conversations to detect voices of conversation participants whose voice characteristics fit a given voice model or voiceprint.

A preferred embodiment of the present invention for use in correctional institutions allows officials to automatically flag future calls on which a voice matching a given voiceprint or fitting a given voice model is detected.

Thus a preferred embodiment of the present invention allows correctional officers to quickly specify a segment of speech within a graphical interface, and search a set of past phone calls and/or flag future phone calls when the voice of the person speaking in the specified speech segment is detected on such calls. This allows easy searching for patterns of identity theft and the like, once an identity theft perpetrator or suspect has been identified by voice segment.

A preferred embodiment of the present invention for use in financial institutions similarly facilitates the building of a voice model or voiceprint from a speech segment of a call on which a credit card fraud perpetrator or suspect's voice segment has been identified, and similarly allows the automated searching of past recorded conversations for occurrences of that person's voice. Such preferred embodiment also allows automated real-time flagging of calls where such perpetrator's voice is detected, allowing improved fraud prevention, and facilitating automated call tracing to aid law enforcement officials in apprehending credit card fraud suspects.

For example, if a customer named Fred had a credit card, and a credit card fraud perpetrator were to obtain Fred's personal identifying information (such as social security number and mother's maiden name), call Fred's credit card company, pretend to be Fred, claim to have moved, and have a new credit card sent to a different address, once the fraud was detected, the credit card company could (using the present invention) find the archived phone conversation, make a model of the perpetrator's voice, automatically detect instances of the perpetrator's voice on the phone in the future, and automatically block future fraud attempts of the perpetrator, while simultaneously in real time alerting law enforcement officials of the phone number the perpetrator calls in from.

In a preferred embodiment, call review officials can use a graphical interface such as shown in FIG. 14 to mark a speech segment which is exemplary of a given emotional state of given speaker, and model of that emotion in that person's voice can be stored. Subsequently, past conversations in which that speaker participated can be searched for instances of similar emotional states. Likewise, future conversations may be monitored in real time to detect the occurrence of a similar emotional state, and such detection can be configured to flag such conversations for later review, or alert personnel in real time when such conversations are taking place.

In a preferred embodiment, call review officials can use a graphical interface such as shown in FIG. 14 to mark a speech segment which is exemplary of a given speech mannerism or phonetic pattern, and store a model of that speech mannerism or phonetic pattern. Subsequently, past conversations can be searched for instances of a similar speech mannerism or phonetic pattern. Likewise, future conversations may be monitored in real time to detect the occurrence of a similar speech mannerism or phonetic pattern, and such detection can be configured to flag such conversations for later review, or alert personnel in real time when such conversations are taking place.

In a preferred embodiment of the present invention for use in financial institutions, certain conversation participants are automatically determined to be "genuine" (either in real time or by subsequent evidence), and speech models or voiceprints are automatically built and saved from such verified genuine recordings to aid in fraud prevention on future calls. For example, if within a given conversation a customer arranges to make a particular payment, and such arranged payment is subsequently made, then, once that payment has been made, the voice in that original recorded conversation can be assumed to be the voice of the customer.

Key points for Financial Services fraudulent transaction detector.
  I. Classify Customer Service to Customer phone conversations as potential or non potential fraud transactions.
     A. Potential Fraudulent transactions (examples)
        i. Change of Address
        ii. New credit card request
        iii. Change in password
        iv. Credit limit increase requests
     B. No Fraud Potential Transactions (examples)
        i. Clarification of a charge
        ii. Arrangements for direct payment
  II. Build voice models by credit card number or corresponding customer ID
     A. Build Voice models for No Fraud Potential Transactions—
        i. If significantly different than previous voice model, build a new model
        ii. If similar to previous voice model, add it to previous voice model and make a new model
     B. Build Voice models for Fraudulent transactions
        i. When a confirmed impostor is detected, build a voice model for the transaction and add the voice model to the impostor models
  III. Fraud detection
     A. When calls come into the Call Center
        i. Check transaction type
        ii. If Potential Fraudulent transaction use JLG Technologies software to look for impostor voice model matches
        iii. Provide real time alerts on high potential loss calls
        iv. Use lie detection software on high potential fraud calls
     B. Post Call Processing
        i. If a call is considered fraudulent after the fact, add the perpetrators voice to the impostor group and use this as part of the fraudulent voice detection group IV. Reporting
　A. The system generates reports to provide potential fraudulent activity
　　i. Low scoring voice model customer calls that have high scoring impostor scores
　　ii. Use lie detection on high potential fraud calls In a preferred embodiment, the voice model used to ongoingly verify the identity of a conversation participant is automatically updated due to circumstances detected in the conversation. For instance, if it is determined that the conversation participant Fred has switched from speaking to an adult to speaking to a child, a voice model previously derived during a speech segment when Fred was speaking to a child would be substituted for the model used when Fred is speaking to an adult. In a preferred embodiment, the boundaries of the speech segments when Fred is speaking to an adult and when Fred is speaking to a child would be determined by speech-to-text conversion, and detection of phrases spoken by Fred such as "put <name> on the phone", or "let me speak to <name>", or phrases spoken by another conversation participant such as "I'll put <name> on the phone", or "here she is", or "here's <name>". In a preferred embodiment, a second detected circumstance which would cause a switch in the voice model used to ongoingly identify Fred would be the detection of a new conversation participant's voice just before the speech segment from Fred for which the second voice model is used.

In the above example, in a preferred embodiment, a third detected circumstance that will cause the system to switch to using a different voice model for ongoing verification of Fred's identity would be the detection of speech from Fred's side of the line (determined, for instance, by telephonic directional separation in an institutional phone call) which is no longer easily verifiable as coming from Fred using the voice model used to verify Fred's previous conversation segment. In a preferred embodiment, when the system switches to using a different voice model for Fred, the system will keep using that voice model until that voice model is no longer a good match, or until circumstances are detected that indicate the system should switch to a different model. As above, such circumstances may include detected words spoken by Fred or another conversation participant or both, and such circumstances may include a change in the detected voice of the person with whom Fred is conversing.

In a preferred embodiment for use in applications where it is desirable to perform ongoing identity verification via voice, when the calculated probability that an imposter is speaking rises above a certain level (or the calculated probability that the correct speaker is speaking falls below a certain level), the system performs an automated search for a best match of the speaker's voice with voice models of suspected imposters. In a preferred embodiment, this imposter search is done in an efficient manner. In one preferred embodiment, voices of persons who could be imposters are divided into a plurality of groupings based on certain measured characteristics of the voice, and only voice models within such grouping as the voice being checked would fall are checked for a match to the possible imposter speaking.

In the literature, persons who's voices get classified into one of a plurality of classifications are sometimes referred to as "cohort speakers". The concept of cohort speakers can be thought of as a way to save time searching for speaker's identity, by comparing a small region of one speaker's speech-feature space with like region of another speaker's speech-feature space, rather than doing an exhaustive comparison of the entire feature space. This is analogous of comparing a portion of a finger print, and only going further in the comparison if that portion appears to be a match.

In a preferred embodiment, another way in which the search is done in an efficient manner is to limit the set of potential imposters to the set of persons known to have access to the phone on which the potential imposter is speaking, at the time the potential imposter is speaking. This limitation feature would, for instance, be useful in limiting the set of potential imposters who might impersonate a given prison inmate, but it would not be as useful in applications such as ongoing voice verification of customers during telephone banking and other financial transactions which might be carried out over the phone. In such financial applications, potential imposter voice models to be searched could, for instance, start with voice models derived from voices previously recorded in transactions which were later determined to be fraudulent.

In a preferred embodiment for use in prisons, rather than simply beginning with voice verification (based on an assumed identity of an inmate from PIN provided or the like), the system starts by performing voice identification, based on a maximum-likelihood search within a set of voice models believed to be representative of all possible persons who could be speaking on a given telephone. Once the most likely identity is derived, that identity is compared to the claimed identity of the inmate speaking. If the claimed identity and the maximum-likelihood-search-derived identity are identical, then the system switches into ongoing voice verification mode.

In a preferred embodiment of the present invention for use in applications where the set of possible conversation participants is known and closed (for instance in a correctional institution, where the set of all possible persons who might use a given telephone is known), the present invention first identifies which voice model or voiceprint most closely matches the voice characteristics of a conversation participant being identified. In such an embodiment, the present invention then switches to ongoing-voice-verification mode. In such a preferred embodiment, the threshold used by the present invention to decide whether the identity of the conversation participant being monitored has changed is chosen based upon the difference between how far off the parameters of the voice of the person speaking are from the parameters of the voice model the speaker has been identified to be associated with compared to how far off the parameters of the voice of the person speaking are from the parameters of the voice model of the next most likely person who the speaker might have been identified as.

An example is provided here for added clarity. Suppose the set of possible conversation participants within a given prison cellblock consists of Fred, Bob, Joe, Ted, and Al. One of these men gets on the phone and begins speaking. The present invention compares the voice parameters of the man who is speaking with the previously stored voice parameters of Fred Bob Joe Ted and Al. The closest match is found to be Al. The next closest match is found to be Ted. After the conversation participant has been identified as Al, the system switches into voice verification mode. If the voice parameters of the person speaking closely match the stored voice parameters of Al, and the voice parameters of the person speaking are very different from the stored voice parameters of Ted, a "large" tolerance will be allowed in the ongoing identity verification of Al as the conversation progresses. On the other hand if the voice parameters of the person speaking closely match the stored voice parameters of Al, and the voice parameters of the person speaking are also fairly close to the stored voice parameters of Ted (though not as close as they are to the voice parameters of Al), a "small" tolerance will be allowed in the ongoing identity verification of Al is the conversation progresses. Also, if the voice parameters of the person speaking are not very close to the stored voice parameters of Al but they're a bit closer to the stored voice parameters of Al than they are to the stored voice parameters of Ted, then again a "small" tolerance will be allowed in the ongoing voice verification of Al.

Thus, in applications where there is little tolerance for errors in voice identification and/or verification, the present invention allows larger variations in a given person's voice before identifying such person as an imposter in closed-population situations where no other persons have similar voices than the present invention allows before identifying such person as an imposter in closed-population situations where one or more other persons have voices similar to the voice of the person speaking Thus, the present invention may be thought of in such applications as having an "imposter detection" threshold which is representative of the amount by which the voice parameters of a given conversation participant are allowed to very during a conversation before that participant is considered an imposter, and the imposter detection threshold for different conversation participants within a given closed set of possible conversation participants will differ from one conversation participant to another, depending on whether there are other persons within the possible set of conversation participants whose voices are similar to the conversation participant whose voice is being identified and/or ongoingly verified within a conversation.

Within this document, the variation tolerance allowed for the measured parameters of a given speaker's voice during ongoing voice verification within a given conversation will be referred to as that speaker's voice identity tolerance within that conversation. Voice identity tolerance may be defined one-dimensionally or multi-dimensionally, depending on the nature of the voice parameter measurements made in a given embodiment of the present invention.

In a preferred embodiment of the present invention incorporating initial voice identification followed by subsequent ongoing voice verification, should the ongoingly monitored parameters of the speaker's voice very by more than the allowed voice identity tolerance (or imposter detection tolerance), the system switches back from voice verification mode into voice identification mode, and once again the most likely identity of the speaker is chosen from within a known closed possible set of speakers, based upon a maximum likelihood search.

In a preferred embodiment of the present invention employing a combination of voice identification and voice verification techniques, statistics indicative of the certainty to which a given conversation participant has been identified in a given conversation are stored along with the voice data and/or text data derived from that conversation through speech-to-text conversion.

In a preferred embodiment, more than one voice model or voiceprint may be stored for a given conversation participant. For instance, if it is found that the voice parameters of a given conversation participant are distinctly and predictably different when he or she speaks to a child on the phone versus when he or she speaks to an adult on the phone it may be advantageous to store two separate voice models or voiceprints, then it would be to try and average the voice parameters of that conversation participant between those two different modes of speaking.

In a preferred embodiment of the present invention employing ongoing voice identity verification within a known close population, and employing voice characterization of an n-dimensional nature, the n-dimensional distance from the voice model of the assumed "correct" conversation participant to the voice model of the "most likely imposter" within the closed population is determined, and ongoing voice verification is done in such a way that if the ongoingly measured voice parameters of the person speaking drift away from their ideal position in voice parameter space by more than half the distance to the closest possible imposter than a "likely imposter" alarm condition is generated.

It can be seen that within a multidimensional model space, while "maximum allowed drift distance" condition determination is optimal if the drift in parameters of the speaker's voice parameters go in the exact direction of the n-dimensional position of the most likely imposter's voice, this alarm condition's tolerance may be unnecessarily tight if the drift of the ongoingly measured voice parameters of the speaker within the n-dimensional space are in a direction other than the direction toward the most likely imposter, and the next most likely imposter is significantly further away in the n-dimensional space than the first most likely imposter is. Plus, in a preferred embodiment the allowed drift distance (within n-dimensional voice model space) of the ongoingly measured voice parameters of the conversation participant differs depending on the direction (within n-dimensional parameter space) of the drift detected.

During the process of ongoing voice identity verification, the shorter the speech segment used to derive voice model parameters is, the less accurate the derived voice model parameters can be assumed to be. However, if the length of a speech segment used to verify identity of a conversation participant is inadvertently made so long that part of it may contain speech from more than one conversation participant, then the identity verification accuracy available from the speech segment is actually less than the identity verification accuracy available from a shorter speech segment which only contains speech from one conversation participant.

In a preferred embodiment of the present invention for use in correctional institutions and the like, the length of speech segments used for ongoing identity verification are chosen based on the boundary conditions of those speech segments. Since it is much more likely that an imposter will enter a conversation immediately following a pause in speech on the side of the line on which the imposter enters the conversation, normally such pauses are used to determine the boundaries of speech segments used in ongoing identity verification. However, it is also possible that inmates in a correctional institution will learn of such an algorithm and will attempt to have an imposter join a conversation by overlapping the imposter's speech with the speech of the "correctly" verified conversation participant. A preferred embodiment of the present invention therefore employs a second speech segment boundary determining mechanism which operates by detecting the simultaneous presence of two voices. Such a detection may be done, for instance, through phase locked frequency domain measurements, or time domain measurements which detect the presence of the periodic pulse trains of more than one set of vocal chords at the same time.

In addition to the use of voiceprints and voice models (such as Gaussian mixture models) known in the art, in a preferred embodiment, the present invention additionally utilizes detection of and classification of speech mannerisms of conversation participants as part of the evidence used to ongoingly verify the identity of conversation participants. In a preferred embodiment, measured speech mannerisms include statistical probabilities of use of words accents timing and the like derived from previous known samples of a given conversation participant's speech.

Real-world applications often make computational efficiency an important benchmark of system performance. Within the present invention one of the methods used to increase computational efficiency without sacrificing too much in the way of false "imposter" detection, is not to analyze all of the speech within a given speech segment. In a preferred embodiment speech segments which are considered to be "long", and which are considered to be highly unlikely to contain speech from more than one individual only need to have a fraction of their speech content analyzed for identity verification purposes. As long as "enough" of the speech within the segment is analyzed, the certainty to which identity verification is carried out can be fairly high. One way in which the present invention is able to select a subset of speech to be analyzed, is to analyze every Nth 10 ms of speech, where the number N is chosen to be small enough to allow reliable voice Identity verification. It should be noted that this style of data reduction may not be usable in situations where speech mannerisms including temporal patterns and speech are being analyzed as part of the identity verification process.

When a speech feature space is mathematically defined such that a certain area of that speech feature space is occupied only by features of the speech of a known subset of possible speakers, the mapping of such known subsets of possible speakers to areas of such a speech feature space is known as a "codebook". It is mathematically possible to define a codebook such that the known subsets of possible speakers referred to by the codebook are each individual speakers. In a case where the codebook is defined such that the known subsets of possible speakers referred to by the codebook each contain a group of possible speakers, the individuals in such a group of possible speakers are referred to as "cohort speakers".

In a preferred embodiment, digital signal processing involved in derivation of voice prints, voice models, phonetic sequences, and text from audio is carried out on DSP processors on boards commercially available graphics cards such as those used for high-end computer games. In a preferred embodiment, one or more such graphics boards is installed in a personal computer (PC) to implement the computational hardware of the present invention. Carrying out digital signal processing on such cards facilitates far more economical implementation of the features of the present invention than implementing all the computation of the present invention on typical personal computer CPUs.

Figure 15:
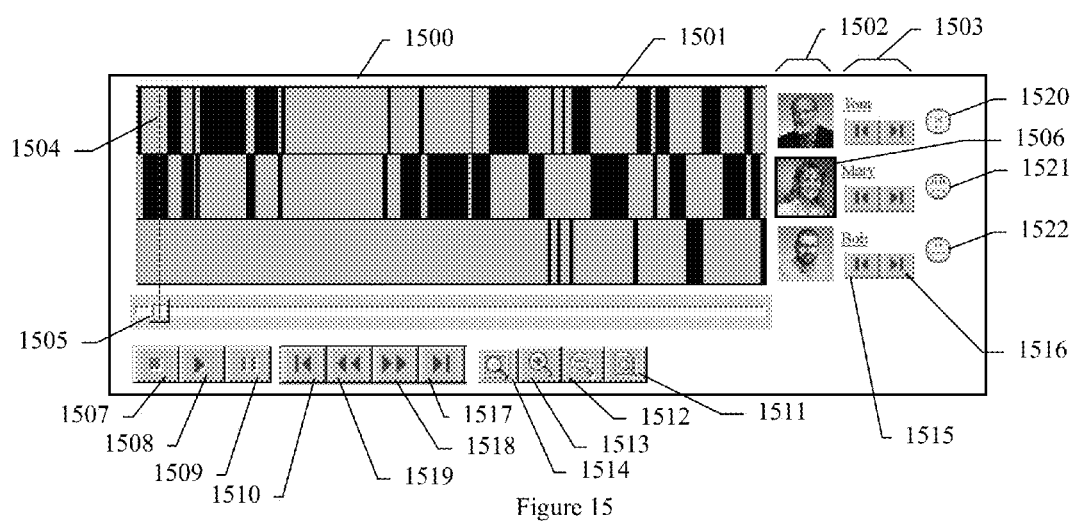
FIG. 15 is a graphical user interface for reviewing recorded conversations according to one aspect of the present invention.

A call monitor/review interface according to a preferred embodiment of the present invention is shown in FIG. 15. Graphical face symbol/name pairs such as 1506 are added to the display as they are detected in a live monitoring application, or all appear when a call to be reviewed is accessed. In a preferred embodiment, during call monitoring using a simple telephone interface, pressing a particular DTMF digit on the monitoring phone will cause the present invention to enunciate identifying information about the individual speaking.

Within this document, means for prompting shall be construed to include recorded voice prompt played under computer control, synthetic voice prompts played under computer control, text prompting on a visual computer-controlled display, prompting by displaying detected condition information stored in a database in response to a database query, and any other means for prompting known in the art. Within this document, means for deriving a voice print or voice model shall include means such as referenced directly or indirectly in U.S. Pat. No. 7,379,868, and any speaker identification and voice identification publications known in the art.

Within this document, means for recording voice signals from telephone conversations shall be construed to include means disclosed in documents such as U.S. Pat. Nos. 7,844,252 and 7,889,847 (which are herein included by reference), and hardware such as available from Adtrans for converting analog telephone signals to digital form, and compressing digital speech streams by known compression algorithms such as G729, and hardware which implements a SIP stack and communicates compressed or uncompressed digital audio in packet form over the Internet.

Within this document, the term loudspeaker shall be construed to include ear-mounted audio speakers such as headphones, earbuds and earphones as well as conventional free-standing loudspeakers.

Within this document, means for monitoring a telephone line for a suspected 3-way call event includes an analog-to-digital converter and may include one or more means known in the art for detecting a 3-way call event, such as silence detection means, click and pop detection means, keyword detection means, special information tone detection means, means for detecting a change in voice characteristics, line impedance change detection means, volume level change detection means, means for distinguishing yelling, or any combination of these means.

Within this document, each of the following are considered to be suspicious call criteria:
identity scamming detection
3-way calls
spoken phone number detected
added called party
high interest group inmate
high interest group called party
newly identified link
matches historical prior confirmed suspicious calling pattern
new called party voice seen on call.
previously identified high interest called party voice detected
whispering detected
prior inmate voice detected For the purposes of this patent application, the above list shall constitute the complete list of suspicious call criteria.

Within this document, the term "voice characteristic data" shall be used to refer to voice model data or voice print data derived from a sample of spoken utterances from an individual. Within this document, the phrase "alerting a call control official" shall be deemed to construe either: placing a phone call to a call control official and playing an audio message, or sounding an audio alarm that can be heard by a call control official, or displaying a visual indicator that can be seen by a call control official, or displaying detected condition information stored in a database in response to a database query, or actuating a vibrating alarm that can be felt by a call control official, or some combination of these. In this document, the term "call-restricting action" shall be construed to mean either alerting a call-control official as to the nature of the call that may merit being cut off, or simply automatically cutting off the call.

Within this document, the term "directional microphone" shall include not only any microphone which is inherently acoustically directional, but also any array of microphones whose signals are processed in either the analog or digital domain to produce a single output signal such that the array behaves like a directional microphone. If all the signals from an array of microphones are recorded in a time-synchronized manner, the recorded signals may be post-processed in different ways after the fact to selectively listen in different directions.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The invention claimed is:

1. A prison phone monitoring system comprising:
    an audio database containing digitized audio signals storing a plurality of voice models and a plurality of recorded telephone calls;
    a call monitoring system for interfacing with a call network for monitoring a first telephone call, wherein the call monitoring system is configured to:
        detect a 3-way call event, wherein the 3-way call event indicates a new voice joining the monitored first telephone call;
        search the audio database for a voice model matching the new voice;
        determine a phone number for an individual associated with the matching voice model; and
        utilizing a call network query to determine a busy status of the phone number during the first telephone call.

2. The prison phone monitoring system of claim 1, wherein the monitoring of the first telephone call further comprises recording the first telephone call and saving the recorded first telephone call to the audio database.

3. The prison phone monitoring system of claim 1, wherein the call monitoring system is further configured to:
    create a new voice model corresponding to the new voice, if no voice model matching the new voice is found in the audio database.

4. The prison phone monitoring system of claim 1, wherein the determined phone number is associated with the matching voice model based on prior monitored communications by the individual using the phone number.

5. The prison phone monitoring system of claim 4, wherein the busy status of the phone number is determined using the call network query, wherein the call network query cannot be detected by the individual.

6. The prison phone monitoring system of claim 1, wherein the busy status is ascertained using automated dialing means.

7. The prison phone monitoring system of claim 1, wherein the call network query comprises a SIP (Session Initialization Protocol) request issued to the determined phone number.

8. A method for monitoring communications within a prison phone system comprising:
    storing digitized audio signals corresponding to a plurality of voice models and a plurality of recorded telephone calls in an audio database;
    monitoring a first telephone call using a call monitoring system configured to interface with a call network;
    detecting a 3-way call event in the monitored first telephone call, wherein the 3-way call event indicates a new voice joining the monitored first telephone call;
    searching the audio database for a voice model matching the new voice;
    determining a phone number for an individual associated with the matching voice model; and
    utilizing a call network query to determine a busy status of the phone number during the first telephone call.

9. The method of claim 8, wherein the monitoring of the first telephone call further comprises recording the first telephone call and saving the recorded first telephone call to the audio database.

10. The method of claim 8, further comprising:
    creating a new voice model corresponding to the new voice, if no voice model is found in the audio database that matches the new voice.

11. The method of claim 8, wherein the determined phone number is associated with the matching voice model based on prior monitored communications by the individual using the phone number.

12. The method of claim 11,
    wherein the busy status of the phone number is determined using the call network query, wherein the call network query cannot be detected by the individual.

13. The method of claim 12, wherein the busy status is ascertained using automated dialing means.

14. The method of claim 12, wherein the telephone network query comprises a SIP (Session Initialization Protocol) request issued to the determined phone number.

* * * * *